(12) United States Patent
Aoki et al.

(10) Patent No.: US 10,773,496 B2
(45) Date of Patent: Sep. 15, 2020

(54) LAMINATED GLASS FOR VEHICLE

(71) Applicant: AGC Inc., Chiyoda-ku (JP)

(72) Inventors: Tokihiko Aoki, Chiyoda-ku (JP);
Shunsuke Sadakane, Chiyoda-ku (JP);
Toshimi Yajima, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 150 days.

(21) Appl. No.: 16/043,892

(22) Filed: Jul. 24, 2018

(65) Prior Publication Data
US 2019/0030865 A1    Jan. 31, 2019

(30) Foreign Application Priority Data

Jul. 26, 2017  (JP) ................................. 2017-144472
Jun. 12, 2018  (JP) ................................. 2018-112014

(51) Int. Cl.
*B32B 3/00*    (2006.01)
*B32B 17/10*    (2006.01)
(Continued)

(52) U.S. Cl.
CPC .......... *B32B 17/10339* (2013.01); *B32B 3/02* (2013.01); *B32B 7/12* (2013.01);
(Continued)

(58) Field of Classification Search
CPC ....... B32B 3/02; B32B 7/12; B32B 17/10036; B32B 17/10293; B60J 1/02; B60J 1/001; B60J 3/007
See application file for complete search history.

(56) References Cited

U.S. PATENT DOCUMENTS

| 2004/0160688 A1 | 8/2004 | Noguchi et al. |
| 2006/0250711 A1 | 11/2006 | Noguchi et al. |

(Continued)

FOREIGN PATENT DOCUMENTS

| EP | 1 464 632 A1 | 10/2004 |
| EP | 3 118 036 A1 | 1/2017 |

(Continued)

OTHER PUBLICATIONS

Extended European Search Report dated Jan. 4, 2019 in European Patent Application No. 18185244.3, 8 pages.

*Primary Examiner* — Elizabeth E Mulvaney
(74) *Attorney, Agent, or Firm* — Oblon, McClelland, Maier & Neustadt, L.L.P.

(57) ABSTRACT

There is provided a laminated glass for vehicle with an information acquisition device, suppressing distortion in a boundary between a light shielding region provided around a transmission region of signals and the transmission region, and being excellent in productivity. A laminated glass for vehicle, which has: a pair of glass plates; and an intermediate adhesive film between the pair of glass plates, wherein the intermediate adhesive film has one continuous transmission region which includes an optical opening for transceiving an optical signal of an information acquisition device disposed inside a vehicle and transceiving the optical signal with outside the vehicle, and a light shielding region provided around a whole periphery of the optical opening except a part thereof, and a light shielding region of the laminated glass for vehicle corresponding to the light shielding region of the intermediate adhesive film has a visible light transmittance of 3% or less.

9 Claims, 13 Drawing Sheets

(51) Int. Cl.
    *B32B 3/02*     (2006.01)
    *B32B 7/12*     (2006.01)
    *B60J 1/00*     (2006.01)
    B60J 1/02     (2006.01)
    B60J 1/08     (2006.01)
    B60J 1/18     (2006.01)
    B60J 7/043     (2006.01)

(52) U.S. Cl.
    CPC .. *B32B 17/10036* (2013.01); *B32B 17/10293* (2013.01); *B60J 1/001* (2013.01); *B32B 2307/102* (2013.01); *B32B 2307/202* (2013.01); *B32B 2307/41* (2013.01); *B32B 2605/006* (2013.01); *B60J 1/02* (2013.01); *B60J 1/08* (2013.01); *B60J 1/18* (2013.01); *B60J 7/043* (2013.01)

(56) References Cited

U.S. PATENT DOCUMENTS

| | | |
|---|---|---|
| 2011/0199674 A1 | 8/2011 | Melcher et al. |
| 2014/0224423 A1 | 8/2014 | Keller |
| 2017/0015180 A1 | 1/2017 | Sakamoto et al. |
| 2017/0341347 A1 | 11/2017 | Nakamura |

FOREIGN PATENT DOCUMENTS

| | | |
|---|---|---|
| EP | 3 248 775 A1 | 11/2017 |
| JP | 2006-327381 A | 12/2006 |
| JP | 2014-156390 | 8/2014 |
| WO | WO 2015/137518 A1 | 9/2015 |
| WO | WO 2015/186839 A1 | 12/2015 |

(a)

(b)

(c)

LAMINATED GLASS FOR VEHICLE

CROSS-REFERENCE TO RELATED APPLICATIONS

This application is based upon and claims the benefit of priority from the prior Japanese Patent Applications No. 2017-144472, filed on Jul. 26, 2017, and No. 2018-112014, filed on Jun. 12, 2018 the entire contents of which are incorporated herein by reference.

FIELD

The present invention relates to a laminated glass for vehicle.

BACKGROUND

Recently, it is known to transceive meaning send and receive, information signals (for example, light having a wavelength of 380 nm to 1100 nm) of road conditions or the like via a window glass (for example, a windshield glass) on which an information acquisition device such as a camera is mounted inside a vehicle. Such information acquisition devices have been sophisticated every year, and by analyzing a photographed image of a subject which is acquired by a camera, it is possible to recognize a car on an opposite lane, a car running ahead, a pedestrian, a road sign, a lane boundary line and so on, to thereby support driving of a vehicle in various ways such as by notifying a driver of danger.

When the information acquisition device is mounted, a window glass for vehicle is provided with a light shielding region for blocking outside light around a region where the above-described signals are transceived. The light shielding region is usually formed in the window glass for vehicle by providing a ceramic light shielding layer by way of burning. However, when the ceramic light shielding layer is provided in the window glass, there is a problem that distortion is generated around a boundary between a portion where the ceramic light shielding layer is provided and the other portion, resulting in that a transmitted image is viewed distorted.

In order to solve this problem, for example, Patent Reference 1 (International Publication No. 2015-137518) discloses a technique of setting a region in which a signal related to an information acquisition device penetrates a window glass to a region which does not include a vicinity of the above-described boundary where distortion is generated.

SUMMARY

Meanwhile, in a case where a window glass for vehicle is a laminated glass, instead of providing a ceramic light shielding layer, it is conceived to make a predetermined region of an intermediate adhesive film be formed of a light shielding film, so that distortion is not generated in a boundary between a light shielding region and a transmission region. However, if the intermediate adhesive film is composed of the light shielding region and the transmission region, it has been supposed that a productivity decrease prominently depending on design.

The present invention is made in view of the above, and its object is to provide, for a laminated glass for vehicle on which an information acquisition device transceiving signals inside and outside a vehicle is mounted, a laminated glass for vehicle which suppresses distortion in a boundary between a light shielding region provided around a transmission region of signals and the transmission region, and which is also excellent in productivity.

A laminated glass for vehicle of the present invention is a laminated glass for vehicle which includes a pair of glass plates; and an intermediate adhesive film between the pair of glass plates, wherein the intermediate adhesive film has one continuous transmission region which includes an optical opening for transceiving an optical signal of an information acquisition device disposed inside a vehicle and transceiving the optical signal with outside the vehicle, and a light shielding region provided around a whole periphery of the optical opening except a part thereof, and a light shielding region of the laminated glass for vehicle corresponding to the light shielding region of the intermediate adhesive film has a visible light transmittance of 3% or less.

According to the present invention, for a laminated glass for vehicle on which an information acquisition device transceiving signals inside and outside a vehicle is mounted, it is possible to provide a laminated glass for vehicle which suppresses distortion in a boundary between a light shielding region provided around a transmission region of signals and the transmission region, and which is also excellent in productivity.

DETAILED DESCRIPTION

Hereinafter, embodiments of the present invention will be described. Note that the present invention should not be limited to these embodiments and that these embodiments can be altered or modified without departing from the gist and scope of the present invention.

The laminated glass for vehicle of the present invention is a laminated glass for a vehicle on which an information acquisition device transceiving signals inside and outside the vehicle is mounted, and transceiving of the signal by the information acquisition device is performed via the laminated glass. The laminated glass for vehicle of the present invention is applicable to a windshield glass, a rear window glass, a door window glass, a sunroof window glass and so on, for example, and application to the windshield glass is suitable.

In this specification, notations of "up" and "down" indicates the upside and the downside respectively at the time that the windshield is mounted on the vehicle. A notation of "upper portion" means a portion on an upper side when the windshield is mounted on the vehicle and a notation of "lower portion" means a portion on a lower side when the windshield is mounted on the vehicle.

Further, in this specification, a peripheral edge portion of a glass plate means a region having a certain width from an end portion of the glass plate toward a center portion of a principal surface. In this specification, in the principal surface of the laminated glass for vehicle, an outer periphery side viewed from the center portion is referred to as an outer side and a center portion side viewed from an outer periphery is referred to as an inner side. In this specification, "almost the same shape and same size" means having the same shape and same size to the eye of a person. Also in other cases, "almost" has the same meaning as above. Further, "to" indicating a numeric range includes an upper and lower limit value.

Figure 1:
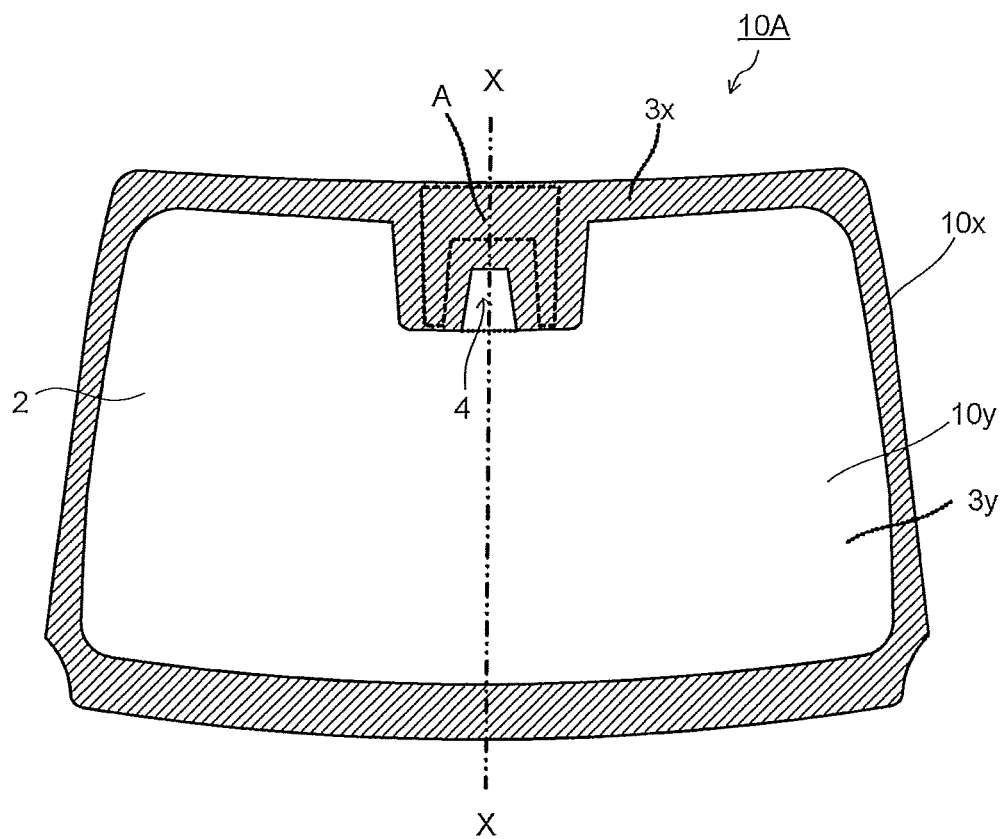
FIG. 1 is a plan view of an example of a laminated glass for vehicle according to an embodiment.
Figure 2:
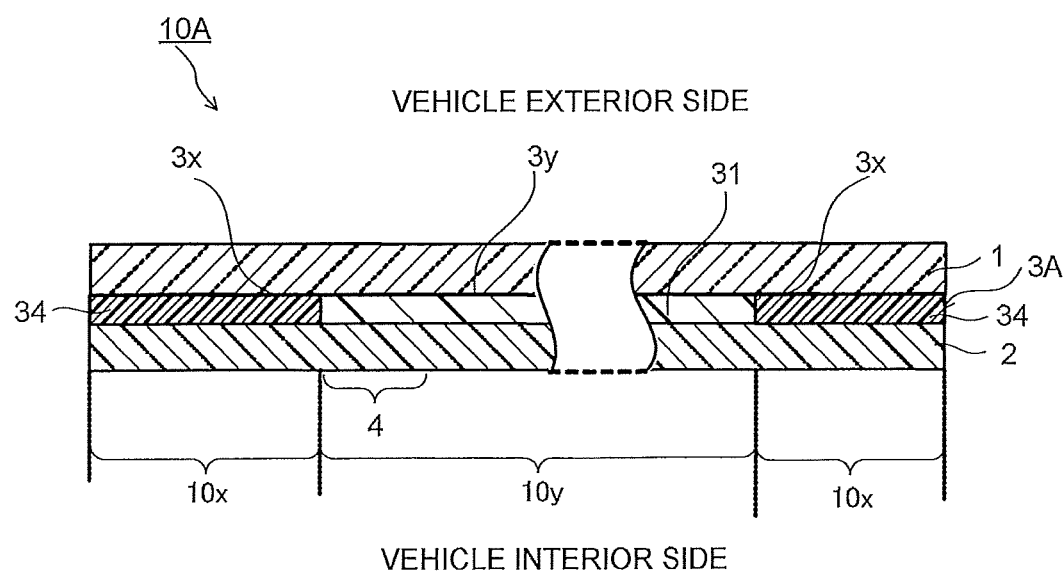
FIG. 2 is a cross-sectional view taken along a line X-X of the laminated glass for vehicle illustrated in FIG. 1.

FIG. 1 is a plan view of an example of the laminated glass for vehicle according to the embodiment. The laminated glass for vehicle illustrated in FIG. 1 is an example of the laminated glass for vehicle which is applied to a windshield glass, and FIG. 1 is the plan view of the laminated glass for vehicle viewed from a vehicle interior side. FIG. 2 is a cross-sectional view taken along a line X-X of the laminated glass for vehicle illustrated in FIG. 1. Hereinafter, the laminated glass for vehicle is simply referred to as the "laminated glass".

A laminated glass 10A illustrated in FIG. 1 and FIG. 2 has a pair of glass plates 1 and 2 of almost the same shape and same size as each other and an intermediate adhesive film 3A sandwiched by the pair of glass plates 1 and 2. The intermediate adhesive film 3A is formed to have almost the same shape and same size as the pair of glass plates 1 and 2. In the laminated glass 10A, the glass plate 1 is provided on a vehicle exterior side while the glass plate 2 is provided on a vehicle interior side. The intermediate adhesive film 3A has one continuous transmission region 3y which includes an optical opening 4 for transceiving of signals of an information acquisition device disposed inside a vehicle and transceiving the optical signals with outside the vehicle, and a light shielding region 3x which is provided around a whole periphery of the optical opening 4 except a part thereof.

The light shielding region 3x in the intermediate adhesive film 3A which the laminated glass 10A has is provided to have a band shape in a whole peripheral edge portion of the intermediate adhesive film 3A and is provided to have a larger width in a vicinity of an upper edge center than in the other part of the upper edge. Further, the light shielding region 3x has a shape in which a part of a lower edge of the portion provided to be wider in the vicinity of the upper edge center of the intermediate adhesive film 3A is cut out so that the lower edge of that portion has a recess. A region surrounded by the recess, in other words, the cut-out region of the light shielding region 3x is the optical opening 4, which is constituted by a part of the transmission region 3y. That is, the optical opening 4 is a trapezoidal region whose three edges are surrounded by the light shielding region 3x, and the optical opening 4 is configured to be connected to the region other than the optical opening 4 of the transmission region 3y in the lower edge of the optical opening 4.

The transmission region 3y in the intermediate adhesive film 3A is a whole region except the light shielding region 3x. In the laminated glass 10A, the transmission region 3y of the intermediate adhesive film 3A is one continuous region, and the light shielding region 3x is also one continuous region. As a result of the above-described configuration, it becomes unnecessary to provide a transmission region independent of the light shielding region 3x for the optical opening 4, reducing man-hours in manufacturing the intermediate adhesive film 3A, so that it is advantageous in terms of productivity.

Note that with regard to a shape of the above-described light shielding region 3x, instead of having the recess in the lower edge of the portion in which the light shielding region 3x is provided wider in the vicinity of the upper edge center of the intermediate adhesive film 3A, a shape may be one in which a recess, namely, a cut-out, is provided in either one of a right edge and a left edge.

In the laminated glass of the present invention, in the case of the windshield glass, the optical opening is often located in the vicinity of the upper edge center in view of a transceiving property of a signal, similarly to in the laminated glass 10A, but the location is not limited thereto. Since the light shielding region 3x is provided around the optical opening 4, the location of the optical opening is to be a location which does not disturb the driving visual field. Further, when the laminated glass is used for a window glass for vehicle other than the windshield glass, such as a rear window glass, a door window glass, a sunroof window glass, and so on, it suffices that the location of the optical opening is appropriately adjusted in correspondence with each window glass.

In the laminated glass of the present invention, as long as the light shielding region of the intermediate adhesive film is provided around the whole periphery of the optical opening except a part of the periphery, a disposition region can be appropriately selected. In other words, it suffices that the light shielding region exists at least around the optical opening. The light shielding region of the intermediate adhesive film is preferably provided to surround 25 to 90% of the whole periphery of the optical opening, more preferably provided to surround 30 to 80% of the whole periphery of the optical opening, and is further preferably provided to surround 40 to 75% of the whole periphery of the optical opening.

The light shielding region of the intermediate adhesive film may be provided in the whole periphery of the peripheral edge portion of the laminated film to have a frame shape similarly to in the laminated glass 10A, or may be provided in a part of the peripheral edge portion to have a band shape, other than around the optical opening. In a case of the windshield glass, it is preferable that the light shielding region is provided in the whole periphery of the peripheral edge portion of the laminated glass, to have a frame shape of about 5 to 200 mm in width. In such a case, the width of the light shielding region of the intermediate adhesive film may be the same or different in upper edge, lower edge, right edge, and left edge, and the width may increase or decrease in each edge.

The laminated glass 10A has a transmission region 10y and a light shielding region 10x which almost coincide with the transmission region 3y and the light shielding region 3x of the intermediate adhesive film 3A in a front view. The light shielding region 10x of the laminated glass 10A has a visible light transmittance of 3% or less. When the visible light transmittance of the light shielding region 10x is 3% or less, outside light around the optical opening can be blocked sufficiently. Further, as a result that the information acquisition device which is usually disposed in a vicinity of the optical opening in a vehicle interior is mounted on the light shielding region, an adhesive agent used for installment or the like is suppressed from being deteriorated due to irradiation of ultraviolet ray. Further, the information acquisition device disposed inside the vehicle and the adhesive agent are not seen, so that design is improved. Further, the same effect can be obtained with regard to components disposed inside the vehicle other than the information acquisition device.

The optical opening 4 in the intermediate adhesive film 3A is a part of the transmission region 3y, and the optical opening in the intermediate adhesive film 3A and the optical opening in the laminated glass coincides with each other in the front view. Hereinafter, the optical opening is described as the optical opening 4 in common to the laminated glass 10A and the intermediate adhesive film 3A.

In a case where the laminated glass 10A is used for the windshield glass, the transmission region 10y preferably has a solar radiation transmittance (Te) of 60% or less and a visible light transmittance (Tv) of 70% or more. The solar radiation transmittance (Te) is more preferably 55% or less and particularly preferably 48% or less. Further, a solar radiation reflectance (Re) is preferably 5% or more and particularly preferably 7% or more. Further, Ae (Ae=100−Te−Re) indicating an amount of heat absorption is preferably 20% or more, more preferably 40% or more, and particularly preferably 45% or more.

The visible light transmittance (Tv) is more preferably 72% or more, and particularly preferably 73% or more. Further, a haze value of the transmission region 10y is preferably 1.0% or less, more preferably 0.8% or less, and particularly preferably 0.6% or less.

The solar radiation transmittance (Te), the solar radiation reflectance (Re), and the visible light transmittance (Tv) are values obtained by measuring a transmittance and a reflectance of a wavelength range in which at least 300 to 2100 nm are included by a spectrophotometer or the like and calculating from calculation formulas prescribed by JIS R3106 (year 1998) and JIS R3212 (year 1998) respectively. In this specification, unless otherwise noted, the solar radiation transmittance, the solar radiation reflectance, and the visible light transmittance mean the solar radiation transmittance (Te), the solar radiation reflectance (Re), and the visible light transmittance (Tv) measured and calculated by the above-described method.

Further, in a case where the laminated glass is used for a window glass for vehicle other than the windshield glass, such as a rear window glass, a door window glass, a sunroof window glass, or the like, it suffices that a characteristic of the transmission region 10y is adjusted in accordance with an optical characteristic required of each window glass. Note that in each window glass, the visible light transmittance in the light shielding region 10x is 3% or less.

In the optical opening 4, the visible light transmittance (Tv), the solar radiation transmittance (Te), the solar radiation reflectance (Re), and the haze value are not limited in particular, and can be the same as in the transmission region 10y as described above. Here, in the optical opening 4, an infrared transmittance, more specifically, an average transmittance to light of a wavelength of 600 to 1100 nm measured by a spectrophotometer or the like is preferably 30% or more, and more preferably 40% or more.

The above-described infrared transmittance is a characteristic required of the optical opening 4. Therefore, it is possible to make only the optical opening 4 of the transmission region 10y have a characteristic different from that of the region other than the optical opening 4, in correspondence with such a characteristic required of the optical opening 4. For example, in later-described composing materials of the intermediate adhesive layer 3A of the transmission region 10y, the material for only the region of the optical opening 4 can be appropriately altered to be different from the material for the region other than the optical opening 4. Concretely, the intermediate adhesive layer 3A of a place corresponding to the optical opening 4 may be replaced by an intermediate adhesive layer different from the intermediate adhesive layer for the region other than the optical opening 4.

The optical opening 4 is provided to include in its region a whole region of a signal transmission region where a signal actually penetrates when the information acquisition device installed inside the vehicle transceives signals. A size of the optical opening 4 is designed so that a distance between an outer periphery of the optical opening 4 and an outer periphery of the signal transmission region is preferably 1 mm or more at a shortest place and 10 mm or less at a longest place.

In the laminated glass for vehicle of the present invention, the light shielding region being a boundary with the optical opening is formed by the light shielding region of the intermediate adhesive film, and thus the boundary between the optical opening and the light shielding region scarcely has distortion. Therefore, the forming region of the optical opening may coincide with the signal transmission region.

However, there is a possibility that a trouble occurs in transceiving signals if the signal transmission region is displaced from a designed position due to displacement of a mounting position of the information acquisition device or when a forming position of the optical opening is displaced from a designed position. Therefore, preferable sizes and positions of the optical opening and the signal transmission region are those described above.

Further, the information acquisition device can be mounted on a predetermined region of a principal surface of the vehicle interior side of the vehicle interior side glass plate, for example. In the laminated glass 10A, a mounting region of the information acquisition device can be a mounting region A surrounded by a broken line in FIG. 1. The mounting region A is provided within the light shielding region 10x of the outer side than an outer edge of the optical opening in the front view. The information acquisition device is constituted by optical apparatuses such as a camera and a sensor housed in a casing, and usually positions of the optical apparatuses such as the camera and the sensor are adjusted to correspond to the position of the optical opening 4 and then the casing is mounted on the mounting region A via an adhesive agent.

Hereinafter, each component of the laminated glass 10A will be described.

[Glass Plate]

Thicknesses of the glass plates 1 and 2 are generally 0.1 to 10 mm, though varying depending on compositions thereof, a composition of the intermediate adhesive film 3A, and use of the laminated glass 10A.

The thickness of the glass plate 2 of the vehicle interior side of the glass plates 1 and 2 is preferably 0.5 to 2.0 mm and more preferably 0.7 to 1.8 mm. The thickness of the glass plate 1 of the vehicle exterior side is preferably 1.6 mm or more, since a flying stone impact resistance is improved thereby. A difference between both thicknesses is preferably 0.3 to 1.5 mm and more preferably 0.5 to 1.3 mm. The thickness of the glass plate 1 of the vehicle exterior side is preferably 1.6 to 2.5 mm and more preferably 1.7 to 2.1 mm. When the thickness of the glass plate is small, distortion of a transmitted image is more likely to occur in a vicinity of a place where a ceramic light shielding layer is provided, and thus an effect of the present invention is further exhibited. Therefore, a total of the plate thicknesses of the glass plate 1 and the glass plate 2 is preferably 4.1 mm or less in view of reduction in weight, more preferably 3.8 mm or less, and further preferably 3.6 mm or less.

The glass plates 1 and 2 can consist of inorganic glass or organic glass (resin). Examples of the inorganic glass include ordinary soda lime glass (which is also referred to as soda lime silicate glass), aluminosilicate glass, borosilicate glass, non-alkali glass, quartz glass, and so on. Among the above, the soda lime glass is particularly preferable. Examples of inorganic glass include float plate glass formed by a float method or the like. As the inorganic glass, glass to which strengthening such as air-cooling tempering and chemical strengthening is applied can also be used.

Examples of the organic glass (resin) include a polycarbonate resin, a polystyrene resin, an aromatic polyester resin, an acrylic resin, a polyester resin, a polyarylate resin, a polycondensate of halogenated bisphenol A and ethylene glycol, an acrylic urethane resin, a halogenated aryl group-containing acrylic resin and so on. Among them, the polycarbonate resin such as an aromatic polycarbonate resin and the acrylic resin such as a polymethyl methacrylate-based acrylic resin are preferable, and the polycarbonate resin is more preferable. Further, among polycarbonate resins, a bisphenol A-based polycarbonate resin is particularly preferable. Note that two or more kinds of the above resins may be used in combination.

The glass may contain an infrared absorbent, an ultraviolet absorbent, or the like. Examples of such glass include green glass, ultraviolet absorbing green glass, which is called as "UV green glass", and so on. The UV green glass contains 68 mass % or more and 74 mass % or less $SiO_2$, 0.3 mass % or more and 1.0 mass % or less $Fe_2O_3$ and 0.05 mass % or more and 0.5 mass % or less FeO, has an ultraviolet transmittance of 1.5% or less at a wavelength of 350 nm, and has a minimum value of the transmittance in a region of 550 nm or more and 1700 nm or less.

It suffices that the glass is transparent, and the glass may be colorless or colored. Further, the glass may be formed of a stack of two or more layers. The inorganic glass is preferable, though depending on a place of application.

Materials of the glass plates 1 and 2 may be the same or different, but it is preferable that the materials are the same. Shapes of the glass plates 1 and 2 may be flat or may have a curvature in a whole surface or a part of the surface. Surfaces exposed to the atmosphere of the glass plates 1 and 2 may have been subjected to coating which gives a water repellent function, a hydrophilic function, an antifogging function or the like. Further, facing surfaces of the glass plates 1 and 2 may have been subjected to coating usually containing a metal layer, such as low-emissivity coating, infrared blocking coating and conductive coating.

Note that the principal surface of the vehicle interior side of the vehicle interior side glass plate 2 preferably has a conductive layer capable of carrying a current in the optical opening 4 vicinity including the optical opening 4. The conductive layer may be provided on the principal surface on the vehicle exterior side of the glass plate 2 or on the principal surface on the vehicle interior side of the glass plate 1. The conductive layer is constituted by a silver paste fired film, for example. When the conductive layer is formed within the region of the optical opening 4, it is preferable that the conductive layer is formed in a line shape so as not to obstacle signal transmission. The conductive layer can be connected to an external power supply via two end portions for example, to thereby suppress fogging of the optical opening 4 by energization heating, when an exterior temperature is low and the laminated glass 10A is easy to be fogged.

[Intermediate Adhesive Film]

The intermediate adhesive film 3A is an adhesive film which bonds the whole surfaces of the principal surfaces facing each other of the glass plates 1 and 2. The intermediate adhesive film 3A is constituted by the flat transmission region 3y and light shielding region 3x described above.

The transmission region 3y is formed of a transparent intermediate film 31 containing a thermoplastic resin which is used for an intermediate adhesive film of an ordinary laminated glass. The kind of the thermoplastic resin is not limited in particular and it is possible to appropriately select the thermoplastic resin among known thermoplastic resins constituting intermediate adhesive films.

Examples of the thermoplastic resin include a polyvinyl acetal resin such as a polyvinyl butyral resin (PVB), a polyvinyl chloride resin (PVC), a saturated polyester resin, a polyurethane resin, an ethylene-vinyl acetate copolymer resin (EVA), an ethylene-ethyl acrylate copolymer resin, a cycloolefin polymer (COP) and so on. The thermoplastic resins may be used independently or two or more kinds of them may be used in combination. The transparent intermediate film 31 contains the thermoplastic resin as a main constituent, and further contains a plasticizer as necessary.

The thermoplastic resin is selected in consideration of balance among various properties required for the transparent intermediate film 31 such as glass transition point, transparency, weather resistance, adhesive strength, permeable resistance, impact energy absorbency, moisture resistance, heat insulating property and so on. The glass transition point of the transparent intermediate film 31 can be adjusted by the kind of the thermoplastic resin and the amount of the plasticizer, for example. In consideration of the balance of the above-described properties, PVB, EVA, the polyurethane resin and so on are preferable as the thermoplastic resin used for the transparent intermediate film 31.

The transparent intermediate film 31 can contain, other than the thermoplastic resin and the plasticizer, one kind or two or more kinds of various additives such as an infrared absorbent, an ultraviolet absorbent, a fluorescer, an adhesion regulator, a coupling agent, a surfactant, an antioxidant, a heat stabilizer, a light stabilizer, a dehydrating agent, a defoaming agent, an antistatic agent, a flame retarder and so on.

The light shielding region 3x of the intermediate adhesive film 3A has the visible light transmittance of 3% or less in order to make the visible light transmittance in the light shielding region 10x of the laminated glass 10A be 3% or less. In the laminated glass 10A, the light shielding region 3x is provided in all the regions where a conventional ceramic light shielding layer was provided. Therefore, in a configuration of the laminated glass 10A, the conventional ceramic light shielding layer is not provided. In the laminated glass of the present invention, the light shielding region 3x of the intermediate adhesive film 3A and the conventional ceramic light shielding layer may be used in combination. In a case of being used in combination, the ceramic light shielding layer is provided in a manner not to adjoin the optical opening 4, as in another example which will be described later.

The light shielding region 3x is formed by providing a colored intermediate film 34 which makes the visible light transmittance be 3% or less in the light shielding region 10x, in the corresponding region of the intermediate adhesive film 3A, for example.

The colored intermediate film 34 can be fabricated by coloring the composing material of the transparent intermediate film 31 which constitutes the transmission region 3y. Concretely, the colored intermediate film 34 can be obtained by making the composition constituting the above-described transparent intermediate film 31 which includes mainly the thermoplastic resin contain a coloring agent. The colored intermediate film 34 may contain a plasticizer for adjusting the glass transition point.

The coloring agent is not limited in particular as long as the coloring agent reduces the visible light transmittance, and example thereof include a dye, an inorganic pigment, an organic pigment and so on. Among the above, the inorganic pigment or the organic pigment is preferable because of little apprehension of color fading due to long-term use, and the inorganic pigment is preferable because of excellency in light resistance.

Examples of the organic pigment include a black pigment such as aniline black, red pigment such as alizarin lake, and so on. Examples of the inorganic pigment include a carbon-based pigment and a metal oxide-based pigment. For example, there can be cited the black pigment such as carbon black, ivory black, Mars black, peach black, lampblack and magnetite triiron tetroxide, a brown pigment such as umber, burnt umber, yellow ochre, Vandyke brown, sienna and burnt sienna, a red pigment such as iron red, molybdenum red and cadmium red, an orange pigment such as chrome orange and chrome vermillion, a blue pigment such as ultramarine blue, iron blue, cobalt blue and cerulean blue, a green pigment such as chromium oxide, viridian, emerald green and cobalt green, a yellow pigment such as chrome yellow, cadmium yellow, iron oxide yellow and titanium yellow, and a purple pigment such as manganese violet and mineral violet. One kind of these coloring agents can be used or two or more kinds thereof can be used in combination.

A compounding amount of the coloring agent is set to an amount making the visible light transmittance of the light shielding region 10x be 3% or less by the light shielding region 3x. The colored intermediate film 34 can further contain one kind or two or more kinds of various additives such as an infrared absorbent, an ultraviolet absorbent, a fluorescer, an adhesion regulator, a coupling agent, a surfactant, an antioxidant, a heat stabilizer, a light stabilizer, a dehydrating agent, a defoaming agent, an antistatic agent and a flame retarder.

The colored intermediate film 34 may be fabricated by a method to form a print layer with dark color on a surface of the transparent intermediate film to bring about the colored intermediate film 34. To the forming method of the dark-colored print layer, an ordinary printing method using a colored material onto a resin substrate is applicable. Examples of the colored material include an organic pigment and an inorganic pigment the same as those of the above-described coloring agent. Note that the print layer in this case is not required to have durability at a temperature around a softening point of glass, unlike the ceramic light shielding layer, and thus, for example, the organic pigment including carbon black can be used. It suffices that a thickness of the print layer is a thickness making the visible light transmittance of the light shielding region 10x be 3% or less, and the thickness may be about 3 to 10 μm.

A film thickness of the intermediate adhesive film 3A can be set to about 0.5 to 3.0 mm in view of securing of a penetration resistance, a weight limit of the laminated glass and securing of handleability. In the intermediate adhesive film 3A, it is preferable that the light shielding region 3x and the transmission region 3y are formed to have the same thickness.

Figure 3:
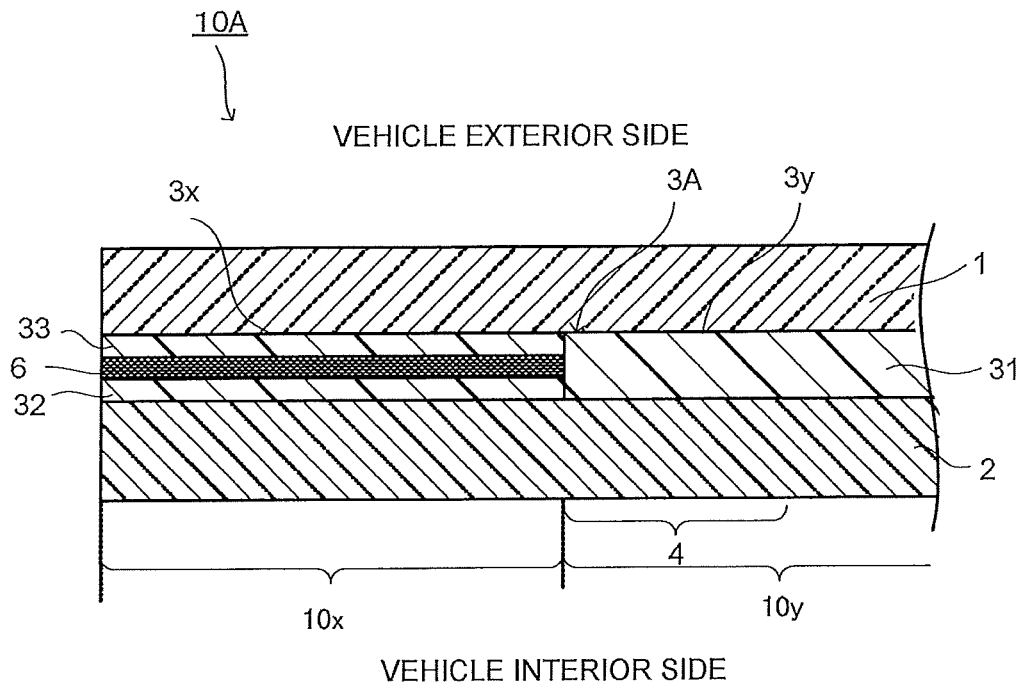
FIG. 3 is a vertical direction cross-sectional view of a vicinity of an upper center of another example of the laminated glass for vehicle according to the embodiment.

The light shielding region 3x may have a configuration in which a light shielding film is sandwiched between a pair of transparent intermediate adhesive layers. FIG. 3 is a vertical direction cross-sectional view of a vicinity of an upper center of a modification example in which, in a laminated glass 10A, as a light shielding region 3x of an intermediate adhesive film 3A, a light shielding film 6 is sandwiched between a pair of transparent intermediate adhesive layers 32 and 33. In the modification example of the laminated glass 10A illustrated in FIG. 3, a configuration can be the same as that of the laminated glass illustrated in FIGS. 1 and 2 except the light shielding region 3x of the intermediate adhesive film 3A.

Examples of the light shielding film 6 include a light shielding polyethylene terephthalate (PET) film, a light shielding polyethylene naphthalate (PEN) film, a light shielding polymethyl methacrylate (PMMA) film and so on. A film thickness of the light shielding film 6 is set to be a film thickness making the visible light transmittance of the light shielding region 10x be 3% or less by the light shielding region 3x obtained in correspondence with a light shielding film to be used. The transparent intermediate adhesive layers 32 and 33 can have configurations the same as that of the transparent intermediate film 31 except the film thickness. The film thicknesses of the transparent intermediate adhesive layers 32 and 33 are preferably adjusted to be the same as the film thickness of the transparent intermediate film 31, as a film thickness of the transparent intermediate adhesive layers 32 and 33 and the light shielding film 6.

Further, in the above, the light shielding region $3x$ may be configured, as necessary, by not providing the transparent intermediate adhesive layer 32 or the transparent intermediate adhesive layer 33, but by sandwiching the light shielding film 6 between the transparent intermediate adhesive layer 33 and the glass plate 2 or between the glass plate 1 and the transparent intermediate adhesive layer 32. Further, the light shielding region $3x$ may be configured by not providing the transparent intermediate adhesive layers 32 and 33 but by providing only the light shielding film 6.

Figure 4:
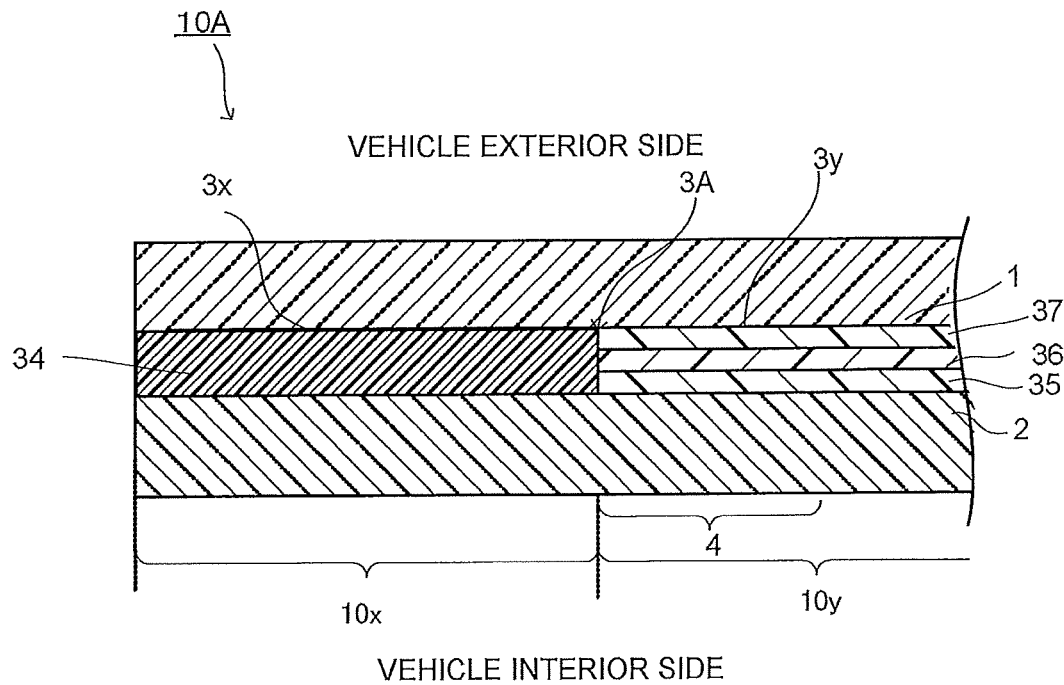
FIG. 4 is a vertical direction cross-sectional view of a vicinity of an upper center of another example of the laminated glass for vehicle according to the embodiment.

The transparent intermediate film constituting the transmission region $3y$ of the intermediate adhesive film 3A is not limited to that of a single layer structure as the transparent intermediate film 31 illustrated in FIGS. 1 and 2. For example, a multilayer film made by stacking transparent intermediate adhesive layers may be used as the transparent intermediate film constituting the transmission region $3y$, and in that case, it is possible to use the multilayer film having a sound insulating property which has been made by stacking transparent intermediate adhesive layers different in glass transition point, for example, as the transparent intermediate film constituting the transmission region $3y$. FIG. 4 is a vertical direction cross-sectional view of a vicinity of an upper center of a modification example in which a transmission region $3y$ of an intermediate adhesive film 3A is constituted by three layers of transparent intermediate adhesive layers 35, 36 and 37 which are different in glass transition point, in a laminated glass 10A. Note that in the laminated glass 10A illustrated in FIG. 4, the transparent intermediate adhesive layers 35, 36 and 37 are stacked in this order from the glass plate 2 side. In the modification example of the laminated glass 10A illustrated in FIG. 4, the laminated glass 10A can have the same configuration as that of the laminated glass 10A illustrated in FIGS. 1 and 2 except the transmission region $3y$ of the intermediate adhesive film 3A.

As the configuration of the transparent intermediate adhesive layers 35 36 and 37 of the transmission region $3y$ in the intermediate adhesive film 3A of the modification example illustrated in FIG. 4, a configuration can be cited in which the transparent intermediate adhesive layer 36 is a core layer of less than 15° C. in glass transition point and the transparent intermediate adhesive layers 35 and 37 are skin layers of 15° C. or more in glass transition point, for example.

Here, the glass transition point in this specification means a peak temperature of tan δ when temperature dependency of tan δ (loss modulus/storage modulus) of a sample is measured by a dynamic viscoelasticity test under conditions of a frequency of 1 Hz, a dynamic shear strain of 0.015%, a temperature increasing rate of 3° C./min, and a measured temperature range of −40° C. to 80° C.

The tan δ can be measured, with a sample formed into, for example, a disk shape having a thickness of 0.6 mm and a diameter of 12 mm being prepared, by a dynamic viscoelasticity measurement apparatus using a parallel plate (12 mm in diameter) as a measuring jig under the above-described conditions. An example of the dynamic viscoelasticity measurement apparatus is Rotational Rheometer MCR301 manufactured by Anton Paar GmbH.

In the modification example of the laminated glass 10A illustrated in FIG. 4, the light shielding region $3x$ has a single-layer structure of the colored intermediate film 34. Such a configuration is preferable since foaming which is likely to occur in an end portion of a multilayer film can be suppressed.

Figure 5A:
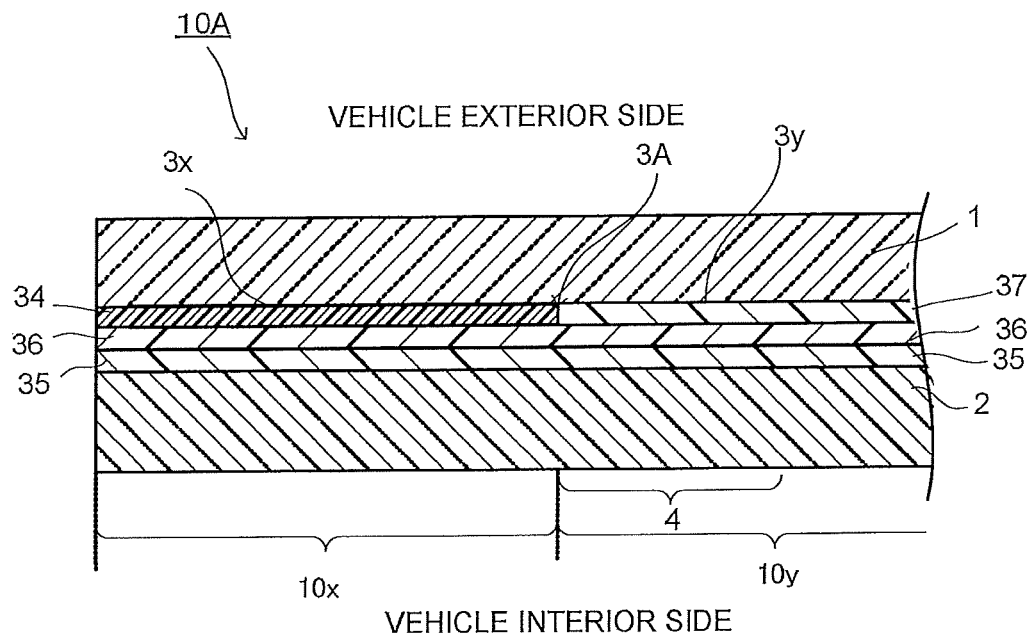
FIG. 5A is a vertical direction cross-sectional view of a vicinity of an upper center of another example of the laminated glass for vehicle according to the embodiment.

Further, the light shielding region $3x$ in the intermediate adhesive film 3A of the modification example of the laminated glass 10A illustrated in FIG. 4 may be configured by a multilayer film. In such a case, it suffices that at least one layer of the multilayer film of the light shielding region $3x$ has a predetermined light shielding property, for example. FIG. 5A illustrates a vertical direction cross-sectional view of a vicinity of an upper center of a modification example in which a light shielding region $3x$ is formed of a multilayer film. In the modification example of the laminated glass 10A illustrated in FIG. 5A, a configuration of a portion other than the light shielding region $3x$ is the same as that in the modification example of the laminated glass 10A illustrated in FIG. 4.

In the modification example of the laminated glass 10A illustrated in FIG. 5A, the light shielding region $3x$ has a configuration in which only a transparent intermediate adhesive layer 37 on a glass plate 1 side of a transmission region $3y$ is replaced by a colored intermediate film 34. As described above, in a case where the light shielding region $3x$ has the configuration in which only one layer among the multilayer film of the transmission region $3y$ is replaced by the colored intermediate film 34, the compounding amount of the coloring agent is adjusted so that the light shielding region $3x$ can make the visible light transmittance of a light shielding region $10x$ be 3% or less only by the one layer of the colored intermediate film 34. Here, the colored intermediate film 34 to replace the transparent intermediate adhesive layer 37 is preferable to have a glass transition point equivalent to that of the transparent intermediate adhesive layer 37, in view of a sound insulating property.

In the modification example of the laminated glass 10A illustrated in FIG. 5A, the layer replaced by the colored intermediate film 34 may be either of the transparent intermediate adhesive layer 35 and the transparent intermediate adhesive layer 36. Further, two layers among these three layers may be replaced, and a configuration is possible in which all the three layers are replaced. When plural layers of the colored intermediate films 34 are provided, the compounding amount of the coloring agent of each layer is adjusted so that the visible light transmittance of the light shielding region $10x$ can be made to be 3% or less by the light shielding region $3x$. Note that when the plural layers of the colored intermediate films 34 are provided, the compounding amounts of the coloring agents in the respective colored intermediate films 34 may be the same or different. Further, similarly to in the case of the transparent intermediate adhesive layer 37, a glass transition point of the colored intermediate film 34 replacing the transparent intermediate adhesive layer 35 is preferably equivalent to that of the transparent intermediate adhesive layer 35, and a glass transition point of the colored intermediate film 34 replacing the transparent intermediate adhesive layer 36 is preferably equivalent to that of the transparent intermediate adhesive layer 36.

Figure 5B:
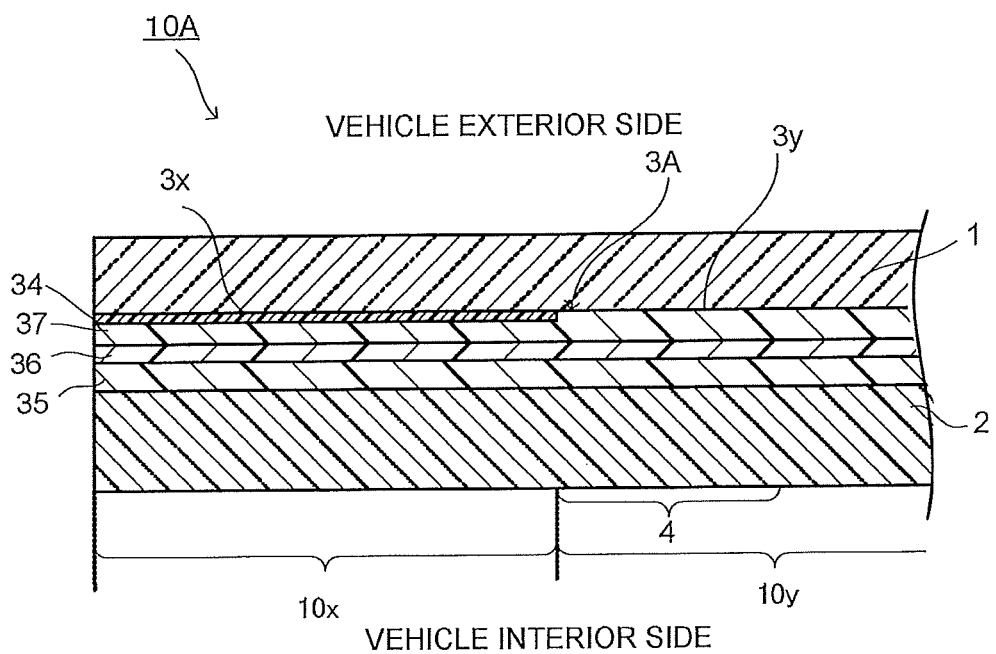
FIG. 5B is a vertical direction cross-sectional view of a vicinity of an upper center of another example of the laminated glass for vehicle according to the embodiment.

The intermediate adhesive film may be configured to have a transparent intermediate film having a planar shape which almost coincides with a planer shape of a laminated glass and a colored intermediate film with a small thickness which is stacked only in a region corresponding to a light shielding region $3x$ of the intermediate adhesive film in the transparent intermediate film. In this case, a region of the transparent intermediate film in which the colored intermediate film is not stacked is a transmission region 3y. The transparent intermediate film may be a single-layer film as the transparent intermediate film illustrated in FIGS. 1 and 2, or may be a multilayer film made by stacking the transparent intermediate adhesive layers as illustrated in FIG. 4. FIG. 5B is a vertical direction cross-sectional view of a vicinity of an upper center of a modification example in which an intermediate adhesive film 3A is configured by stacking thin colored intermediate films only in a light shielding region 3x of a transparent intermediate film having a planar shape which almost coincides with a planar shape of a laminated glass, in the laminated glass 10A.

In FIG. 5B, the intermediate adhesive film 3A has a transparent intermediate film of a configuration in which transparent intermediate adhesive layers 35, 36 and 37 are stacked in this order from a glass plate 2 side. The transparent intermediate adhesive layers 35, 36 and 37 can be the same as the transparent intermediate adhesive layers 35, 36 and 37 illustrated in FIG. 4 except that the planar shape almost coincides with the planar shape of the laminated glass. In FIG. 5B, the intermediate adhesive film 3A has a colored intermediate film 34 in the region to be the light shielding region 3x on a principal surface on a glass plate 1 side of the transparent intermediate adhesive layer 37. Note that the colored intermediate film 34 may be provided in a region to be the light shielding region 3x on the principal surface on a glass plate 2 side of the transparent intermediate adhesive layer 35, instead of being provided on the transparent intermediate adhesive layer 37.

The colored intermediate film 34 can be obtained, for example, similarly to in the case of the colored intermediate film illustrated in FIG. 5A, by dispersing a coloring agent such as an inorganic pigment or an organic pigment in a thermoplastic resin composition such as a polyvinyl acetal resin such as a polyvinyl butyral resin (PVB), a polyvinyl chloride resin (PVC), a saturated polyester resin, a polyurethane resin, an ethylene-vinyl acetate copolymer resin (EVA), an ethylene-ethyl acrylate copolymer resin and a cycloolefin polymer (COP). As a thermoplastic resin film which can be made to be the colored intermediate film 34 by dispersion of the coloring agent, a film A disclosed in JP-A No. 2014-156390 is suitable. In the colored intermediate film 34, a compounding amount of the coloring agent is adjusted so that the visible light transmittance of the light shielding region 10x can be made to be 3% or less by the light shielding region 3x.

A thickness of the transparent intermediate film of the transparent intermediate adhesive layers 35, 36 and 37 in total is preferably about 0.5 to 3.0 mm as described above. Meanwhile, a thickness of the colored intermediate film 34 is preferably 20 to 80 μm. When the thickness of the colored intermediate film 34 falls within this range, handleability of the film is good and a deaeration property of laminated glass manufacturing can be well maintained. In other words, as illustrated in FIG. 5B, it is possible to obtain a laminated glass 10A in which a level difference of a boundary between the region having the colored intermediate film 34 and the region not having the colored intermediate film 34 of the transparent intermediate film is settled.

Figure 5C:
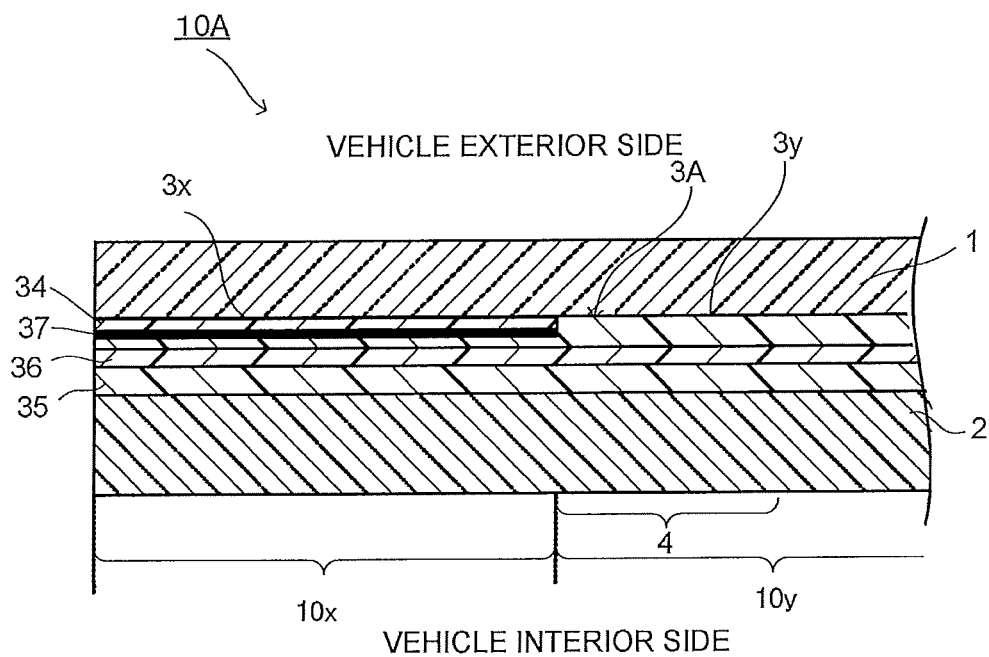
FIG. 5C is a vertical direction cross-sectional view of a vicinity of an upper center of another example of the laminated glass for vehicle according to the embodiment.
Figure 5D:
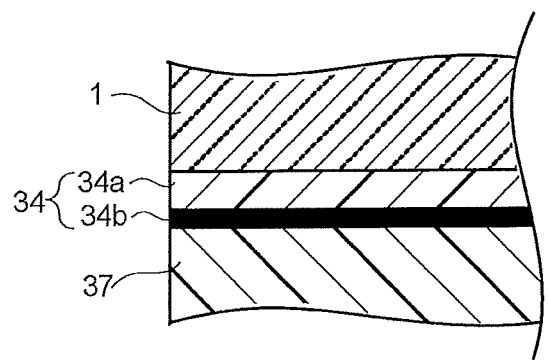
FIG. 5D is an enlarged cross-sectional view of a light shielding region of an intermediate adhesive film of the laminated glass for vehicle illustrated in FIG. 5C.

FIG. 5C illustrates a vertical direction cross-sectional view of a vicinity of an upper center of a modification example in which a colored intermediate film 34 is made by forming a print layer with dark color on a surface of a transparent intermediate film, in the laminated glass 10A illustrated in FIG. 5B. FIG. 5D illustrates an enlarged cross-sectional view of a light shielding region 3x of an intermediate adhesive film 3A of the laminated glass 10A illustrated in FIG. 5C.

In the modification example of the laminated glass 10A illustrated in FIG. 5C and FIG. 5D, a configuration other than that of the colored intermediate film 34 can be the same as that in the modification example of the laminated glass 10A illustrated in FIG. 5B. The colored intermediate film 34 illustrated in FIG. 5C and FIG. 5D has a configuration in which a print layer 34b is formed in a transparent intermediate film 34a. The transparent intermediate film 34a can be constituted by the same material as that of the transparent intermediate film 31 illustrated in FIGS. 1 and 2, and the film A disclosed in JP-A No. 2014-156390 is suitably used. The print layer 34b can be the same as the above-described print layer. A thickness of the transparent intermediate film 34a is preferably 20 to 80 μm and a thickness of the print layer 34b is preferably 3 to 10 μm. When the thicknesses of the transparent intermediate film 34a and the print layer 34b fall within this range, handleability of the film is good and a deaeration property of laminated glass manufacturing can be well maintained. As illustrated in FIG. 5C and FIG. 5D, a configuration is preferable that in the colored intermediate film 34 the print layer 34b is not in contact with a vehicle interior side surface of the glass plate 1, in other words, a configuration is preferable that the transparent intermediate film 34a is in contact with the glass plate 1. The above configuration can maintain good adhesiveness between the intermediate adhesive film 3A and the glass plate 1.

Note that in the colored intermediate film 34 illustrated in FIG. 5C, the print layer 34b is formed in the whole surface of the transparent intermediate film 34a. That is, shapes of the transparent intermediate film 34a and the print layer 34b in a plan view coincide with each other. The configuration of the colored intermediate film 34 is not limited to the above configuration, and a forming region of the transparent intermediate film 34a may be larger than a forming region of the print layer 34b as long as the forming region of the print layer 34b coincides with the region to become the light shielding region 3x of the intermediate adhesive film 3A. For example, in a modification example of the laminated glass 10A illustrated in a vertical direction cross-sectional view of a vicinity of an upper center in FIG. 5E, in a colored intermediate film 34, a transparent intermediate film 34a is configured to extend to a center portion of a laminated glass 10A in relation to a print layer 34b. When an end portion of the transparent intermediate film 34a which occupies a great part of a thickness of the colored intermediate film 34 exists in a vicinity of an optical opening 4, distortion may be generated by its influence in the vicinity of the optical opening 4. By a configuration of the colored intermediate film 34 illustrated in FIG. 5E, an end portion of the transparent intermediate film 34a can be placed apart from an optical opening 4 by a predetermined distance, so that influence to an optical apparatus such as a camera and a sensor can be prevented.

Figure 5E:
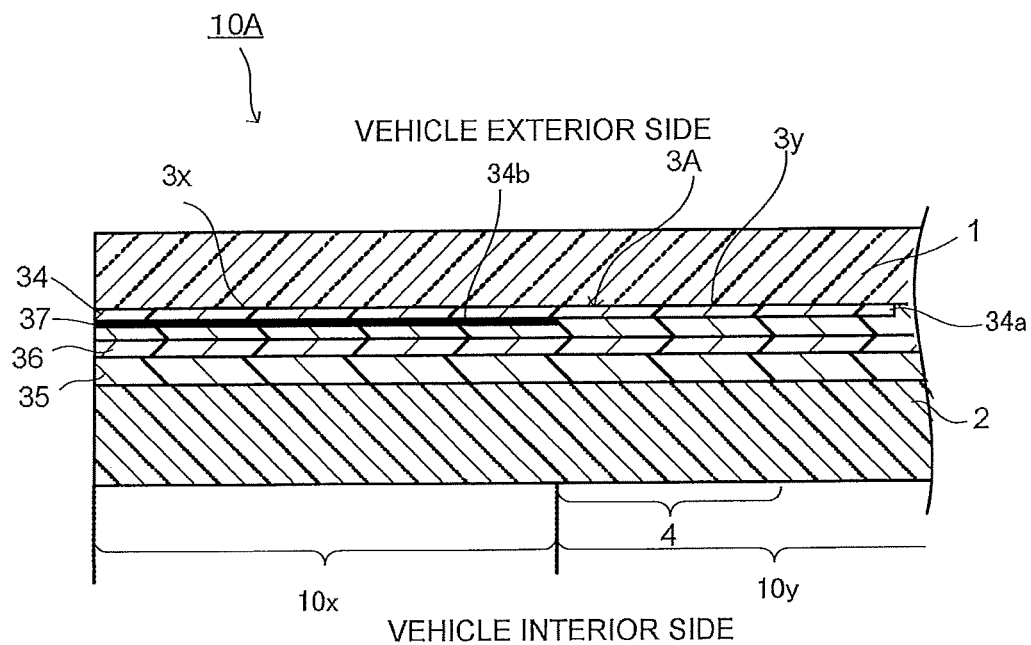
FIG. 5E is a vertical direction cross-sectional view of a vicinity of an upper center of another example of the laminated glass for vehicle according to the embodiment.
Figure 5F:
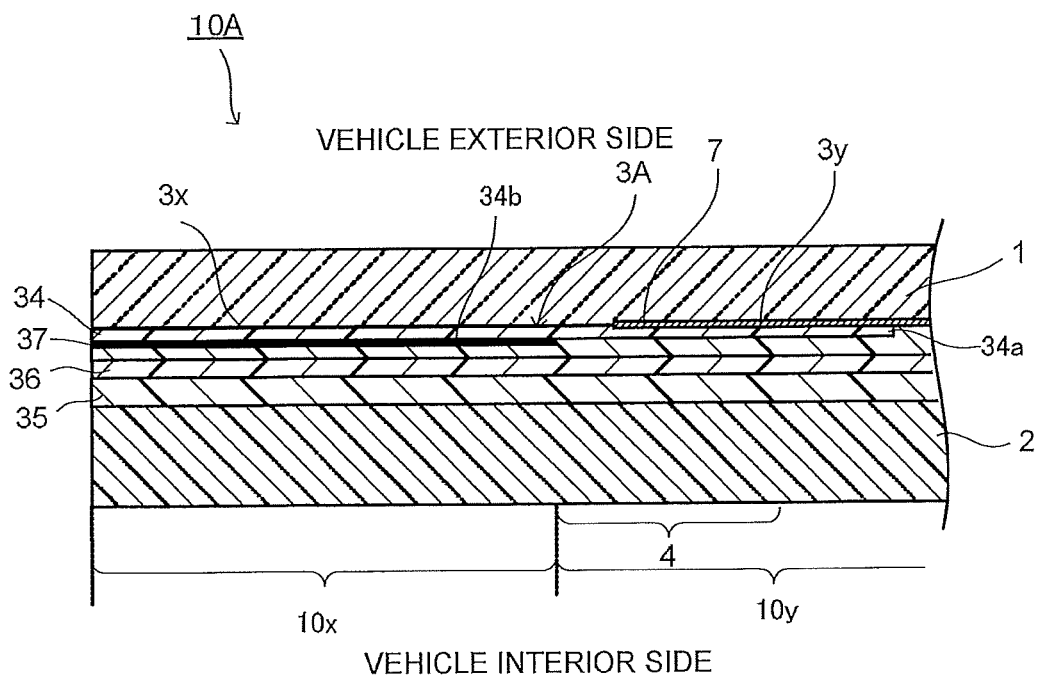
FIG. 5F is a vertical direction cross-sectional view of a vicinity of an upper center of another example of the laminated glass for vehicle according to the embodiment.

The laminated glass 10A sometimes has infrared blocking coating on the vehicle interior side of the glass plate 1. As a modification example of the laminated glass 10A illustrated in FIG. 5E, FIG. 5F illustrates an example of a case where an infrared reflective film 7 is provided on a vehicle interior side of a glass plate 1 as infrared blocking coating, by way of a vertical direction cross-sectional view of a vicinity of an upper center. A glass plate 10A illustrated in FIG. 5F is the same as the laminated glass 10A illustrated in 5E, except that the glass plate 10A illustrated in FIG. 5F has the infrared reflective film 7 on a vehicle interior side of the glass plate 1. The infrared reflective film 7 is provided in almost the whole surface of a vehicle interior surface of the glass plate 1 so as not to overlap a forming region of a print layer 34b of a colored intermediate film 34 in a plan view. When an end portion of the infrared reflective film 7 exists in the forming region of the print layer 34b, design may be impaired. Further, in order to suppress influence of distortion to the optical opening 4 due to the infrared reflective film, a distance between the end portion of the infrared reflective film 7 and an end portion of a printing layer 34b is preferably 0 mm or more and 5 mm or less, and more preferably 0 mm or more and 3 mm or less.

For example, when both ceramic light shielding layer and infrared reflective layer are formed on the vehicle interior side surface of the glass plate 1, accurate position adjustment of both layers is difficult due to the fact that forming methods and forming processes of the ceramic light shielding layer and the infrared reflective film are different. However, in a case where the light shielding region 10x of the laminated glass A is formed of the print layer 34b of the colored intermediate film 34 as the laminated glass 10A illustrated in FIG. 5F, position adjustment of the print layer 34b and the infrared reflective film 7 is easier.

Figure 5G:
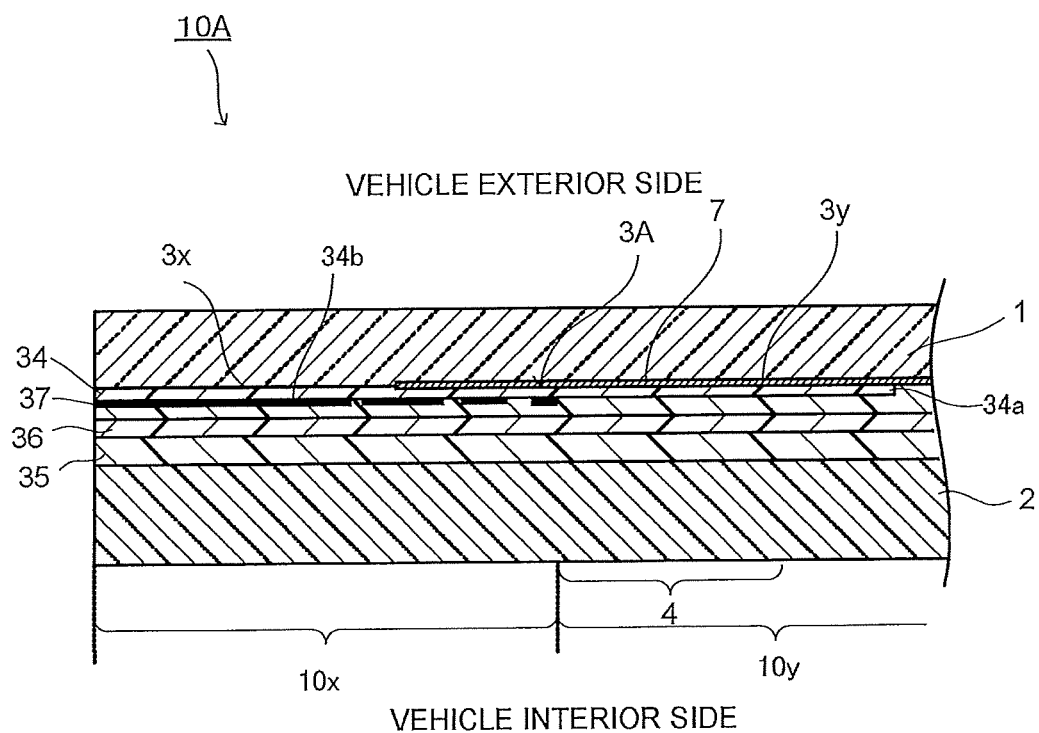
FIG. 5G is a vertical direction cross-sectional view of a vicinity of an upper center of another example of the laminated glass for vehicle according to the embodiment.

In the above-described colored intermediate film 34 in which the print layer 34b is formed on the transparent intermediate film 34a, the print layer 34b may be provided in a dotted pattern in a region near the optical opening 4. The dotted pattern can be the same as that in a ceramic light shielding layer described later. FIG. 5G illustrates a vertical direction cross-sectional view of a vicinity of an upper portion center of a modification example of the laminated glass 10A which is the same as the laminated glass 10A illustrated in FIG. 5E except that a print layer 34b of a colored intermediate layer 34 partially has a dotted pattern and that an infrared reflective layer 7 is provided on a vehicle interior side of a glass plate 1. In the laminated glass 10A illustrated in FIG. 5G, an end portion of the infrared reflective layer 7 is located in a dotted pattern forming region of the print layer 34b.

For example, when a ceramic light shielding layer is formed on a vehicle interior side surface of a glass plate 1 in a manner that the light shielding layer is dotted in a region close to an optical opening 4 and an infrared reflective layer is formed on the glass plate 1 in a manner to overlap the dotted pattern forming region, external appearance and design may be deteriorated due to color-dulling of the infrared reflective layer in an overlapped portion. Instead of forming the ceramic light shielding layer in the dotted pattern on the glass plate 1, by forming a dotted pattern in a print layer 34b which an intermediate adhesive film 3A has, similarly to the case of the laminated glass 10A illustrated in FIG. 5G, above-described deterioration of design can be improved.

With regard to the intermediate adhesive film 3A, in the case of the laminated glass 10A illustrated in FIGS. 1 and 2, it suffices that the transparent intermediate film 31 formed into a shape of the transmission region 3y is fit inside the colored intermediate film 34 formed into a shape of the light shielding region 3x and sandwiched between the glass plates 1 and 2 by the same method for ordinary laminated glass. Also in the modification examples illustrated in FIG. 3 and FIG. 4, it suffices that the light shielding region 3x and the transmission region 3y are formed separately and that both are combined.

In the modification example illustrated in FIG. 5A, for example, after the transparent intermediate adhesive layers 35 and 36 are stacked, the colored intermediate film 34 constituting the light shielding region 3x and the transparent intermediate adhesive layer 37 filling the region other than the light shielding region 3x are stacked on the transparent intermediate adhesive layer 36, and thereby the intermediate adhesive film 3A is obtained.

More specifically, resin sheets are produced in order to form respective layers of the transparent intermediate adhesive layers 35, 36 and 37 and the colored intermediate film 34. The resin sheets for forming the transparent intermediate adhesive layers 35 and 36 each have a continuous size to be able to form both regions of the transmission region 3y and the light shielding region 3x, for example. Meanwhile, the resin sheet for forming the transparent intermediate adhesive layer 37 has a size for forming only the transmission region 3y. Further, the resin sheet for forming the colored intermediate film 34 has a size for forming only the light shielding region 3x.

In the modification examples illustrated in FIG. 5B and FIG. 5C, for example, the transparent intermediate adhesive layers 35, 36, 37 are stacked to have a continuous size enabling both regions of the transmission region 3y and the light shielding region 3x to be formed simultaneously. The colored intermediate film 34 of a size for forming only the light shielding region 3x is stacked on the transparent intermediate adhesive layer 37 of the obtained stack.

Each resin sheet can be produced by forming a resin composition having a composition suitable for each layer into a sheet shape. A forming condition can be appropriately selected in accordance with the kinds of the thermoplastic resins. These resin sheets can be stacked in a predetermined order and heated under a pressure, to thereby obtain the intermediate adhesive film 3A. Note that a part or the whole of the intermediate adhesive film 3A may be formed by coextrusion.

Regarding the transmission region 3y of the intermediate adhesive film 3A, only the optical opening may be replaced by the transparent intermediate film having the high infrared transmittance, as described above.

The intermediate adhesive film 3A may include what is called a shade band layer which relieves an occupant of a vehicle from glaring due to sunlight. The shade band layer is provided in a peripheral edge portion of an edge becoming an upper edge when the laminated glass 10A is mounted on the vehicle.

Further, in a laminated glass 10A, a functional film other than an intermediate adhesive film 3A may be provided between a pair of glass plates 1 and 2. The functional film is disposed, for example, between layers constituting the intermediate adhesive film 3A. Examples of the functional film include an infrared blocking film and so on. Note that the infrared blocking film, if provided, is usually provided in a region except an optical opening.

Next, there is described an example in which, in the laminated glass of the present invention, a light shielding region of the laminated glass is configured by combining a light shielding region of an intermediate adhesive film and a light shielding layer provided on a glass plate. The light shielding layer provided on the glass plate is usually a ceramic light shielding layer, and the following example will be described on the assumption that the light shielding layer is the ceramic light shielding layer, but the light shielding layer is not limited thereto. Further, in the following example, the light shielding layer is provided on a principal surface on a vehicle interior side of the vehicle interior side glass plate, but the light shielding layer may be provided on either principal surface of either glass plate.

Figure 6:
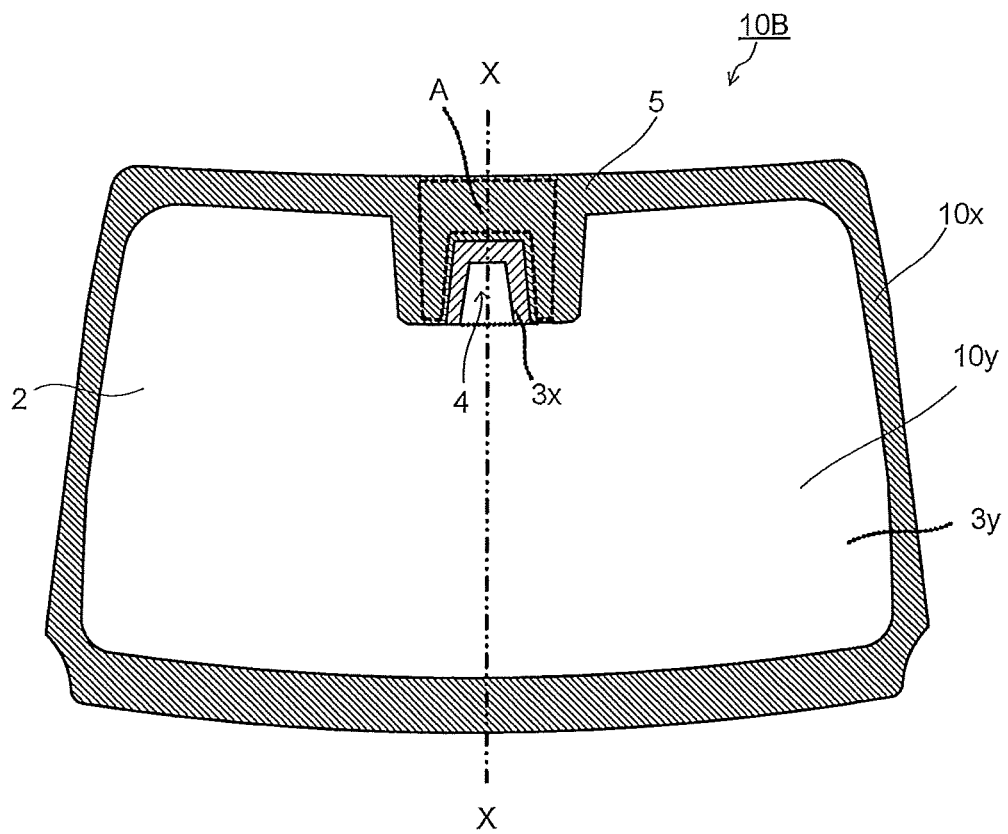
FIG. 6 is a plan view of another example of the laminated glass for vehicle according to the embodiment.
Figure 7:
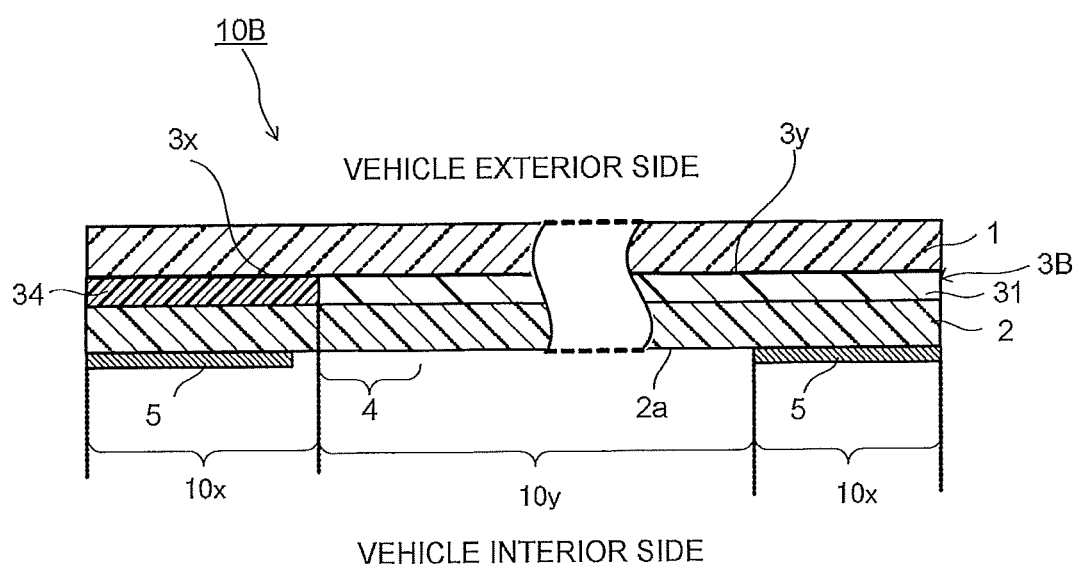
FIG. 7 is a cross-sectional view taken along a line X-X of the laminated glass for vehicle illustrated in FIG. 6.
Figure 8:
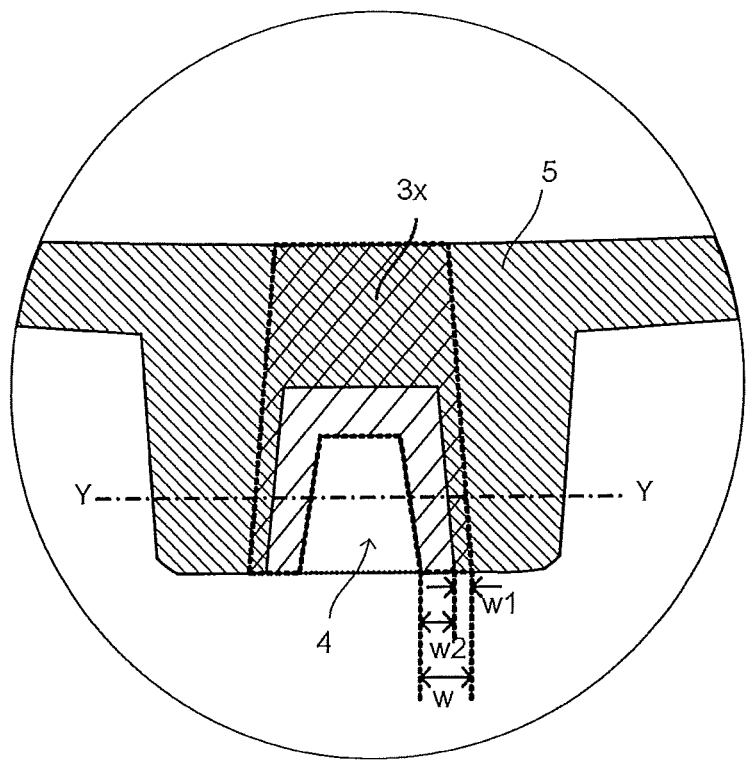
FIG. 8 is an enlarged plan view of a vicinity of an upper center of the laminated glass for vehicle illustrated in FIG. 6.
Figure 9:
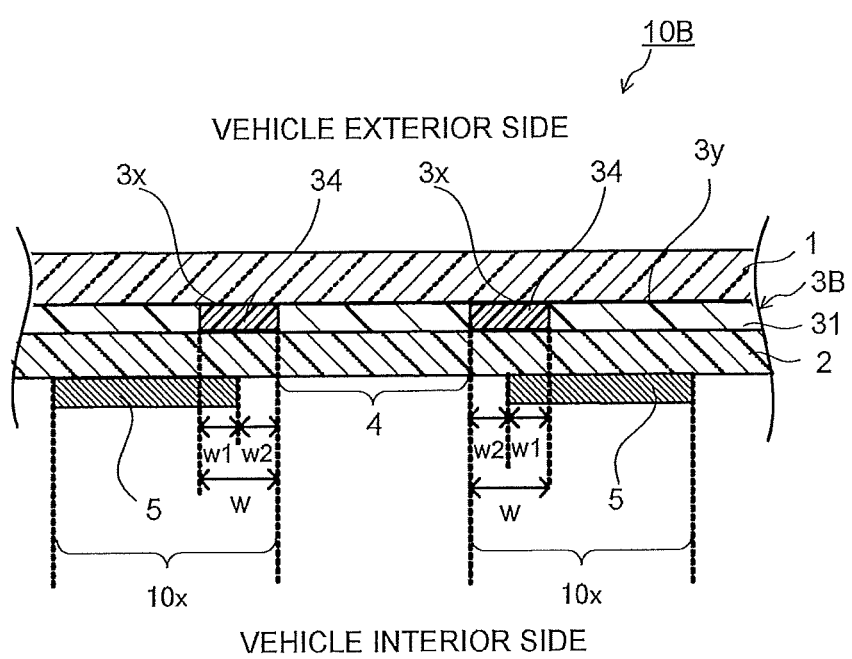
FIG. 9 is a cross-sectional view taken along a line Y-Y of a vicinity of an upper center of the laminated glass for vehicle illustrated in FIG. 8.
Figure 10A:
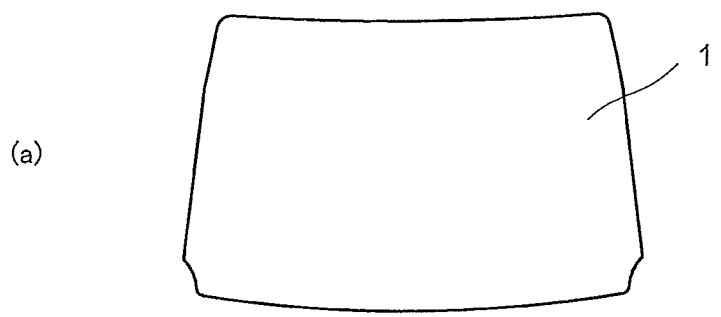
FIG. 10A are plan views of components of the laminated glass for vehicle illustrated in FIG. 6.
Figure 10A:
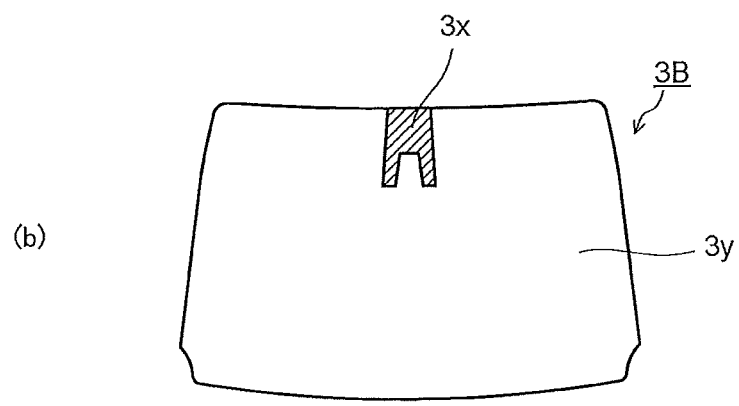
Figure 10A:
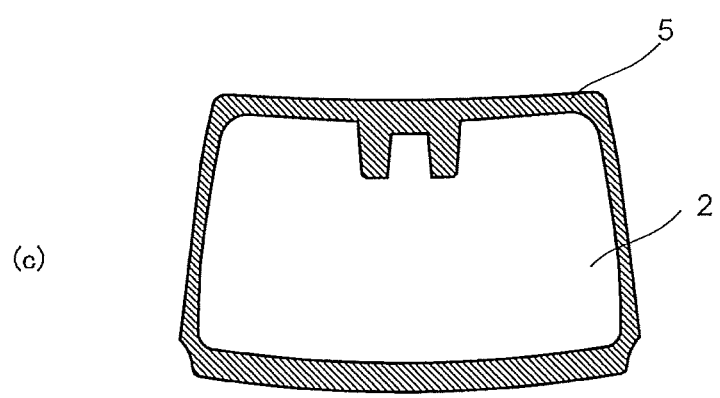

FIG. 6 is a plan view of an example of the laminated glass according to the embodiment. A laminated glass 10B illustrated in FIG. 6 is an example of a laminated glass for vehicle applied to a windshield glass, and FIG. 6 is a plan view of the laminated glass 10B seen from a vehicle interior side. FIG. 7 is a cross-sectional view taken along a line X-X of the laminated glass 10B illustrated in FIG. 6. FIG. 8 is an enlarged plan view of a vicinity of an upper center of the laminated glass 10B illustrated in FIG. 6. Note, FIG. 8 is a figure illustrating overlapped states of the light shielding region 3x of the intermediate adhesive film 3B and the ceramic light shielding layer 5 and a real appearance is just illustrated in FIG. 6. FIG. 9 is a cross-sectional view taken along a line Y-Y of a vicinity of an upper center of the laminated glass 10B illustrated in FIG. 8. FIG. 10A are plan views of components of the laminated glass 10B illustrated in FIG. 6.

The laminated glass 10B has a configuration the same as that of the laminated glass 10A except that the laminated glass 10B has an intermediate adhesive film 3B in which forming regions of a transmission region 3y and a light shielding region 3x are different from those in the intermediate adhesive film 3A in the laminated glass 10A and has a ceramic light shielding layer 5 in a principal surface 2a on a vehicle interior side of a vehicle interior side glass plate 2. In FIG. 10A, a diagram (a) illustrates a plan view of a vehicle exterior side glass plate 1 which is viewed from a vehicle interior side, a diagram (b) illustrates a plan view of an intermediate adhesive film 3B which is viewed from the vehicle interior side, and a diagram (c) illustrates a plan view of a vehicle interior side glass plate 2 where a ceramic light shielding layer 5 is formed in a principal surface on the vehicle interior side which is viewed from the vehicle interior side. In the following description, description of a configuration of the laminated glass 10B which is the same as that of the laminated glass 10A will be omitted.

A light shielding region 10x in the laminated glass 10B is a region obtained by combining the light shielding region 3x of the intermediate adhesive film 3B and a forming region of the ceramic light shielding layer 5, and has almost the same range as that of the light shielding region 10x of the laminated glass 10A. The light shielding region 3x is provided around a whole periphery of an optical opening 4 except a part of the periphery. The ceramic light shielding layer 5 is provided in a peripheral edge portion of a vehicle interior side principal surface 2a of the glass plate 2 to have a frame shape in a manner not to include the optical opening 4 and not to adjoin the optical opening 4.

The light shielding region 10x in the laminated glass 10B, having a visible light transmittance of 3% or less in each of a region corresponding only to the light shielding region 3x of the intermediate adhesive film 3, a region corresponding only to the ceramic light shielding layer 5, and a region where both overlap each other, have the above-described function required of the light shielding region.

The light shielding region 3x of the intermediate adhesive film 3B, as illustrated in FIG. 8 and FIG. 10A(b), has a shape having a recess in a lower edge of an almost trapezoidal shape whose upper edge coincides with an upper edge of the laminated glass 10B in a front view. The optical opening 4 is a part of the transmission region 3y and is a trapezoidal region whose three edges are surrounded by the light shielding region 3x, and the optical opening 4 is configured to be connected to the region other than the optical opening 4 of the transmission region 3y in the lower edge of the optical opening 4.

Figure 10B:
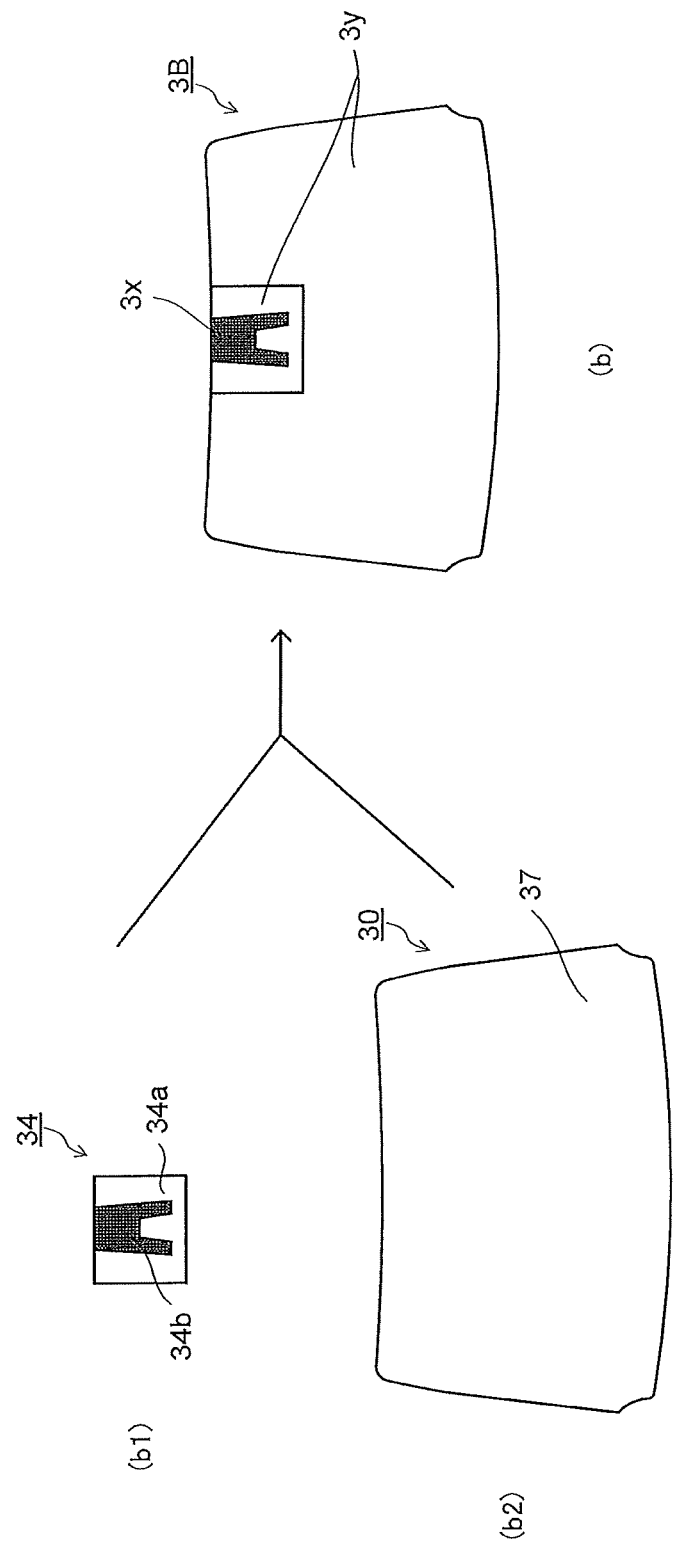
FIG. 10B are plan views of components of an intermediate adhesive layer of a laminated glass for vehicle of another example of the laminated glass for vehicle according to the embodiment.

The intermediate adhesive film 3B, as illustrated in FIG. 10B, may have a light shielding region 3x and a transmission region 3y by a different configuration from the above. FIG. 10B is a plan view of components of an intermediate adhesive layer 3B in a modification example of a laminated glass 10B which is the same as the laminated glass 10B illustrated in FIG. 6 to FIG. 10A except that an intermediate adhesive layer 3B is different. The intermediate adhesive layer 3B illustrated in FIG. 10B (b) is configured by stacking a colored intermediate film 34 having a print layer 34b in a transparent intermediate film 34a which is illustrated in FIG. 10B (b1) on a transparent intermediate adhesive layer 37 of a transparent intermediate film 30 with a configuration where transparent intermediate adhesive layers 35, 36 and 37 are stacked in this order from a glass plate 2 side, which is illustrated in FIG. 10B (b2). The colored intermediate film 34 is stacked on the transparent intermediate film 30 in a manner that the print layer 34b is positioned to constitute the light shielding region 3x and that the print layer 34b is in contact with the transparent intermediate adhesive layer 37.

The intermediate adhesive layer 3B which is configured by stacking a colored intermediate film 34 having a print layer 34b in a transparent intermediate film 34a on a transparent intermediate adhesive layer 37 of a transparent intermediate film 30 with a configuration where transparent intermediate adhesive layers 35, 36 and 37 are stacked in this order from a glass plate 2 side has almost the same configuration as the intermediate adhesive film 3A in the modification example of the laminated glass 10A illustrated in FIG. 5E except that a forming region of a print layer 34b and a shape of the transparent intermediate film 34a are different, and can be fabricated in the same way. In the colored intermediate film 34 illustrated in FIG. 10B (b1), the print layer 34b has a shape having a recess in a lower edge of an almost trapezoidal shape whose upper edge coincides with an upper edge of the laminated glass 10B in a front view, which is provided around a whole periphery of the optical opening 4 except a part of the periphery. The transparent intermediate film 34a has a configuration in which its outer periphery is positioned on a side outer than an outer periphery of the print layer 34b in a front view, and the transparent intermediate film 34a is formed to have a size by which an outer periphery (end portion) of the transparent intermediate film 34a does not exist in the optical opening.

The ceramic light shielding layer 5 in the laminated glass 10B, as illustrated in FIG. 8 and FIG. 10A(c), is provided in a manner to be wider in a vicinity of an upper edge center than the other part of the upper edge, in order that its forming region has a shape to include a neighborhood of an outer periphery of the optical opening in a front view. As a result of the above-described shape, the ceramic light shielding layer 5 can have a mounting portion A for mounting an information acquisition device. By mounting the information acquisition device on the ceramic light shielding layer 5 via an adhesive agent or the like, fixation of the information acquisition device can be made stronger, and it is preferable.

In the laminated glass 10B, forming regions of the light shielding region 3x of the intermediate adhesive film 3B and the ceramic light shielding layer 5 are formed to have an overlapped part. FIGS. 7, 8, and 9 illustrate overlapped states of the light shielding region 3x and the ceramic light shielding layer 5. An overlapped width wt of the light shielding region 3x and the ceramic light shielding layer 5 is preferably 1 mm or more and more preferably 3 mm or more in order to facilitate position adjustment or the like. Meanwhile, a distance w2 between the optical opening 4 and the ceramic light shielding layer 5 is preferably 3 mm or more, more preferably 8 mm or more, further preferably 20 mm or more, and particularly preferably 30 mm or more in order to suppress influence of distortion to the optical opening 4 by the ceramic light shielding layer 5.

Further, in order to satisfy these conditions, the light shielding region 3x is preferable to be provided around the optical opening 4 in a manner that at least the width w is 4 mm or more, and the width w is more preferable to be 8 mm or more.

The light shielding region 3x and the transmission region 3y of the intermediate adhesive film 3B can be the same as the light shielding region 3x and the transmission region 3y in the intermediate adhesive film 3A except that their shapes are different. The light shielding region 3x of the intermediate adhesive film 3B can be constituted by the colored intermediate film 34 and the transmission region 3y can be constituted by the transparent intermediate film 31. Further, it is possible to apply the modification example of the intermediate adhesive film 3A illustrated in the above-described laminated glass 10A to the intermediate adhesive film 3B.

The ceramic light shielding layer 5 can be formed in a vehicle interior surface 2a of the glass plate 2 by a conventional known method. The ceramic light shielding layer 5 can be formed, more specifically, by applying a black ceramic paste obtained by adding powder of heat resistant black pigment together with low-melting point glass powder to a resin and a solvent and kneading them onto a predetermined region of the vehicle interior surface 2a of the laminated glass plate 2 by printing or the like, followed by heating and baking. Further, the black pigment used for forming the ceramic light shielding layer includes also a combination of pigments which turn black by a combination of a plurality of colored pigments. A thickness of the ceramic light shielding layer 5 is preferably about 8 to 20 μm and more preferably 10 to 15 μm.

The ceramic light shielding layer 5 may be provided in a dotted pattern in a region close to the optical opening 4. To the dotted pattern, a conventional known dotted pattern is applicable. For example, a shape of a dot is not limited to a circle but can be an oval, a rectangle, a polygon, a pentagram, and so on. Further, a dotted pattern can be such that a dotted part is made to be transparent and a ceramic light shielding layer is provided in the other part. By providing the ceramic light shielding layer 5 in the dotted pattern, influence of distortion to the optical opening 4 by the ceramic light shielding layer 5 can be further reduced. The above-described region in which the dotted pattern is provided is preferably a region of 10 mm or more in width from an end portion close to the optical opening 4 of the ceramic light shielding layer 5, a region of 20 mm or more in width is more preferable, and a region of 30 mm or more in width is further preferable.

Figure 11:
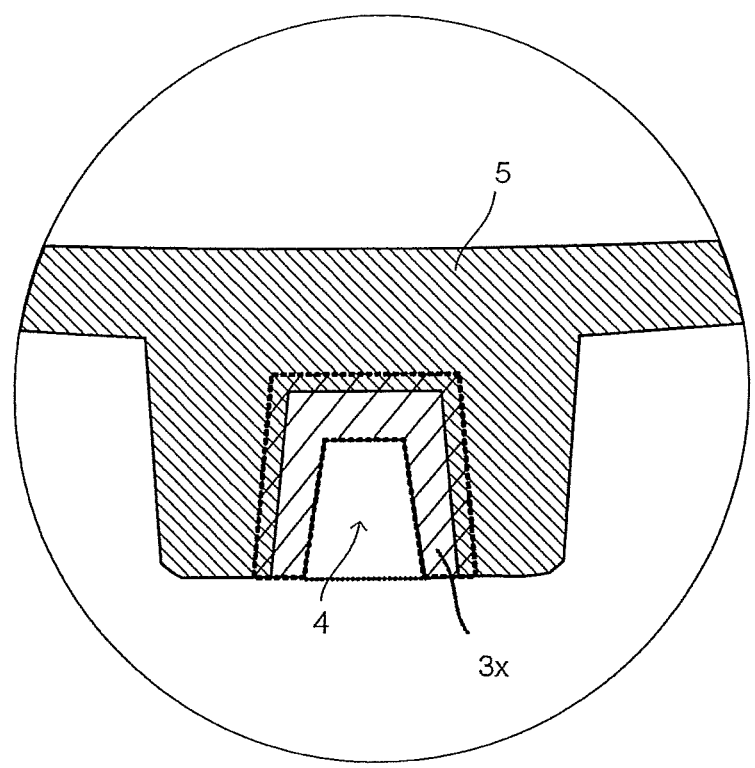
FIG. 11 is an enlarged plan view of a vicinity of an upper center of another example of the laminated glass for vehicle according to the embodiment.

In the laminated glass 10B having the light shielding region 3x of the intermediate adhesive film 3B and the ceramic light shielding layer 5, a planar shape of the light shielding region 3x of the intermediate adhesive film 3B is not limited to the shape illustrated in FIG. 8. FIG. 11 illustrates an enlarged plan view of a vicinity of an upper center of a modification example in which a shape of a light shielding region 3x of an intermediate adhesive film 3B is different from that of the laminated glass 10B illustrated in FIG. 6 to FIG. 10A, in the laminated glass 10B. The modification example illustrated in FIG. 11 is an example in which the light shielding region 3x of the intermediate adhesive film 3B is formed in a limited range surrounding an optical opening 4. Note, FIG. 11 is a figure illustrating overlapped states of the light shielding region 3x of the intermediate adhesive film 3B and the ceramic light shielding layer 5 and a real appearance is same as that illustrated in FIG. 6. A forming region of the light shielding region 3x of the intermediate adhesive film 3B can be appropriately selected in a combination of a forming region of a ceramic light shielding layer 5, in correspondence with a region of the light shielding region 10x required as the laminated glass 10B. The same applies to the forming region of the ceramic light shielding layer 5.

Figure 12:
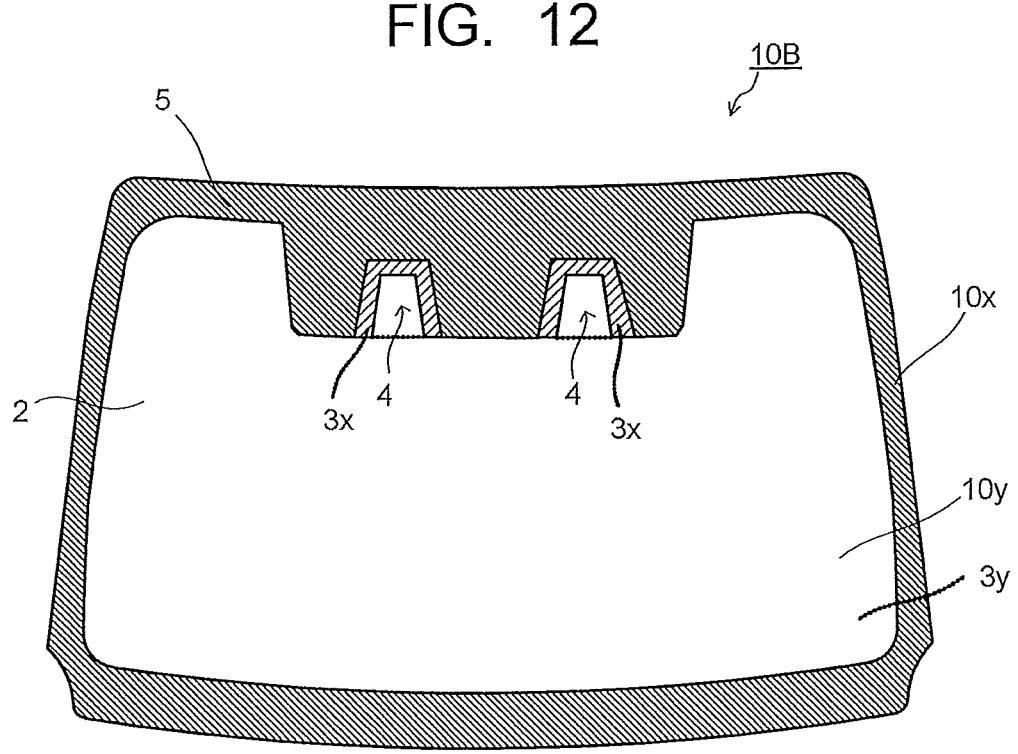
FIG. 12 is a plan view of another example of the laminated glass for vehicle according to the embodiment.

FIG. 12 illustrates a plan view of another modification example of the laminated glass 10B. The modification example of the laminated glass 10B illustrated in FIG. 12 is an example in which two optical openings 4 are provided. In this modification example, a configuration may be the same as the configuration of the laminated glass 10B illustrated in FIG. 6 to FIG. 10A except that a forming region of a ceramic light shielding layer 5 and a forming region of a light shielding region 3x of an intermediate adhesive film 3B are different.

In the modification example of the laminated glass 10B illustrated in FIG. 12, the forming region of the ceramic light shielding layer 5 is a region illustrated in FIG. 12, and the light shielding region 3x of the intermediate adhesive film 3B can be formed, for example, around each optical opening, to have a shape illustrated in FIG. 8 or a shape illustrated in FIG. 11. The light shielding region 3x may have a shape in which these are continuously provided. In a case where the number of the optical opening is three or more, a configuration may be such that, similarly, a light shielding region 3x of an intermediate adhesive film 3B is provided at least around an optical opening 4 excluding a part of its periphery and that a light shielding region 10x required of the laminated glass 10B other than that is formed of a ceramic light shielding layer 5. In either case, an overlapped width of the light shielding region 3x of the intermediate adhesive film 3B and the ceramic light shielding layer 5, a distance between the ceramic light shielding layer 5 and the optical opening 4, and so on preferably fall within the same range as above.

Also in the laminated glass 10A, when a plurality of the optical openings 4 are provided, for example, when two optical openings 4 are provided as in the modification example of the laminated glass 10B illustrated in FIG. 12, it is possible to cope with the case by forming a light shielding region 3x of an intermediate adhesive film 3A to have the shape of the light shielding region 10x of the modification example of the laminated glass 10B illustrated in FIG. 12.

In a case where the laminated glasses 10A and 10B have sound-insulating intermediate adhesive films 3A and 3B, their sound transmission losses in a coincidence region measured in accordance with SAE J1400 are preferably 35 dB or more, and further preferably 42 dB or more. The laminated glass having a sound transmission loss of 35 dB or more can be evaluated to be excellent in sound insulating property.

The laminated glasses 10A and 10B can be manufactured by a known method. That is, with regard to the laminated glass 10A, an intermediate adhesive film 3A is disposed between a pair of glass plates 1 and 2 to thereby obtain a precursor, and the precursor is inserted into a vacuum bag such as a rubber bag. Then, the precursor is heated to 70 to 110° C. while depressurizing is performed, so that a pair of the glass plates 1 and 2 are bonded by the intermediated adhesive film 3A. Thereafter, heating pressurizing is performed as a pressing treatment, as necessary. The pressing treatment can further improve durability.

Further, the laminated glass 10B can be manufactured by a method the same as the manufacturing method for the above-described laminated glass 10A, except that by using, as a glass plate 2, a glass plate 2 with ceramic light shielding layer 5 obtained by forming a ceramic light shielding layer 5 on one of principal surfaces of the glass plate 2 in advance by the above-described method, and using an intermediate adhesive film 3B instead of the intermediate adhesive film 3A, the glass plate 2 with ceramic light shielding layer 5 is stacked in a manner that the ceramic light shielding layer 5 is placed on an opposite side to an intermediate adhesive film 3B in the manufacturing method of the laminated glass 10A.

EXAMPLES

Figure 13:
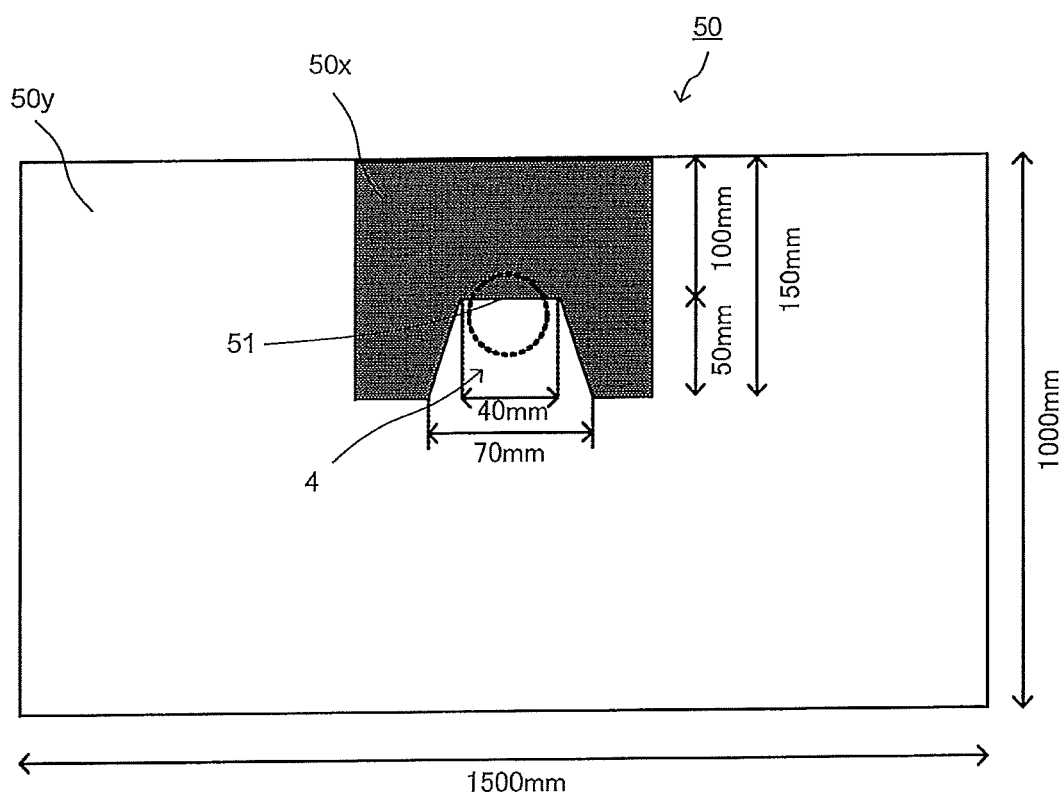
FIG. 13 is a plan view of a laminated glass used for evaluation of distortion of a transmitted image in the example.

Hereinafter, the present invention will be described in more detail by examples. Note that the present invention is not limited to the examples described below. In Example 1 and Comparative Example 1 below, there was each fabricated a laminated glass 50 having a transmission region 50y and a light shielding region 50x a plan view of which is illustrated in FIG. 13. In the Example 1, the light shielding region 50x was constituted by an intermediate film while in Comparative Example 1 the light shielding region 50x was constituted by a ceramic light shielding layer.

Example 1

There was prepared an intermediate film, as the intermediate adhesive film which had a transmission region corresponding to the transmission region 50y of the laminated glass 50 and a light shielding region corresponding to the light shielding region 50x of the laminated glass 50 and having a visible light transmittance of 3% or less.

The intermediate film used for the transmission region had a first skin layer (0.33 mm in thickness), a core layer (0.1 mm in thickness) and a second skin layer (0.33 mm in thickness) in this order from a vehicle exterior side.

Compositions of the respective skin layers are the same and both were made of PVB (30° C. in glass transition point). Further, the core layer was made of PVB (3° C. in glass transition point). The intermediate film for the transmission region was formed by stacking both the skin layers and the core layer constituted by resin sheets made of PVB. A total thickness of the intermediate film for the transmission region was 0.76 mm.

The intermediate film used for the light shielding region had a single-layer structure and contained PVB (30° C. in glass transition point) and a coloring agent. As the coloring agent, carbon black was used. A content of the coloring agent was 0.1 mass % in a total of PVB and the coloring agent, and a thickness was 0.76 mm.

Note that the intermediate film was fabricated as follows. First, there was prepared an intermediate film for transmission region which has a size of 1500 mm horizontally and 1000 mm vertically, and a part equivalent to the light shielding region was cut out to have a shape illustrated in FIG. 13, from a longitudinal side center. Subsequently, there was cut out an intermediate film for light shielding region having a size the same as the part equivalent to the light shielding region having been cut out, and it was fit into the aforementioned intermediate film for transmission region, to thereby form an optical opening where a part of a periphery was surrounded by the light shielding intermediate film contained the coloring agent. This process was able to improve productivity substantially, compared with a process of further hollowing out the inside of an intermediate film for light shielding region and fitting another intermediate film for transmission region thereinto to thereby dispose the intermediate film for light shielding region in a whole periphery of an optical opening.

Thereafter, pressing was carried out by using a hot press forming machine to thereby fabricate the intermediate film. Conditions of pressing were 150° C., 300 seconds and 50 kg/cm$^2$ in pressing pressure. Note that the above-described thicknesses of respective layers ware thicknesses after pressing.

Next, the intermediate film was disposed between a glass plate (2.0 mm in thickness) to be placed on a vehicle exterior side and a glass plate (2.0 mm in thickness) to be placed on a vehicle interior side, to thereby obtain a stack. Each of the glass plates of the vehicle exterior side and the vehicle interior side was made of soda lime glass and has a size of 1500×1000 mm.

Thereafter, the stack was put into a vacuum bag and pressure bonding was performed by carrying out heating to 110° C. while performing deaeration to make the inside of the vacuum bag have a pressure reduction degree of −60 kPa or less. Pressure bonding was performed further under conditions of 140° C. in temperature and 1.3 MPa in pressure. Thereby, there was fabricated the laminated glass 50 in which the intermediate film having the transmission region and the light shielding region was sandwiched between a pair of glass plates.

Comparative Example 1

A laminated glass 50 was fabricated similarly to in Example 1, except that there was used, as an intermediate adhesive film, an intermediate film the whole of which has a stack structure the same as that of the transmission region of Example 1, namely, the intermediate film constituted by only the transmission region and that a ceramic light shielding layer with a shape the same as the light shielding region of the interlayer film used in Example 1, namely, a shape corresponding to the light shielding region 50x of the laminated glass 50 was provided on a vehicle interior side surface of a glass plate to be placed on a vehicle interior side.

Note that the ceramic light shielding layer was formed by applying and baking a ceramic paste to the glass plate to be located on a vehicle exterior side. For the ceramic paste, a pigment and a glass frit were used and applied by screen printing to a portion corresponding to the blocking region in Example 1. Further, the baking was performed under a condition of 800° C.

Figure 14:
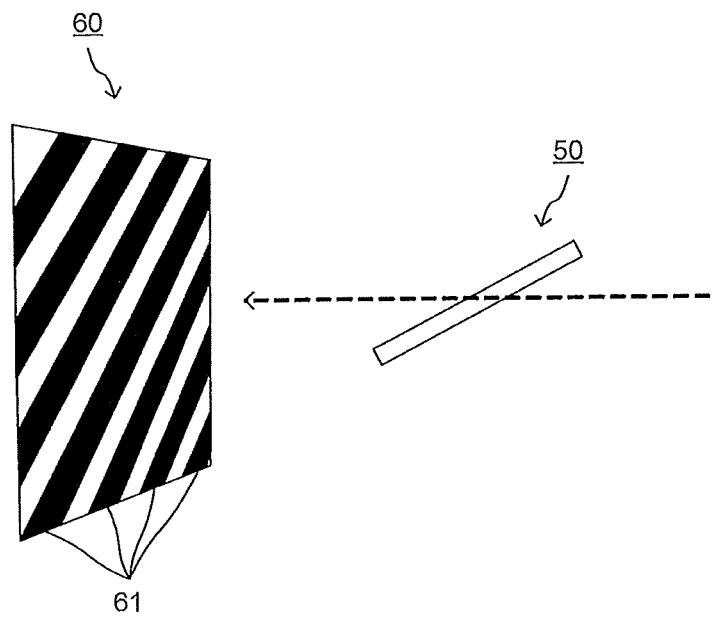
FIG. 14 is a view explaining an evaluation method of distortion of a transmitted image in the example.

Next, distortion of a transmitted image was evaluated as follows regarding laminated glasses in Example 1 and Comparative Example 1. First, as illustrated in FIG. 14, the laminated glass was disposed inclined at the same angle as that of an installation time to an automobile, and a zebra pattern 60 was disposed on the vehicle exterior side. The zebra pattern 60 is made by providing a plurality black lines 61 on a white background. The black lines 61 were provided at an angle of 45 degrees in relation to a lower edge of the zebra pattern 60 and in a manner to be parallel to one another.

Figure 15A:
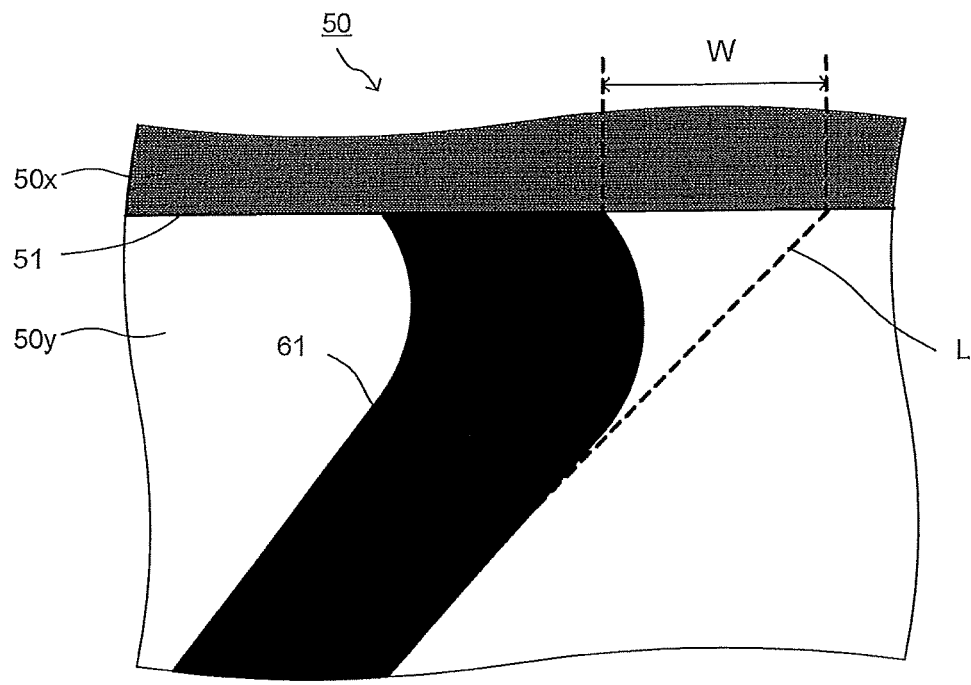
FIG. 15A is another view explaining the evaluation method of the distortion of the transmitted image in the example.

FIG. 15A illustrates an example of the zebra pattern 60 viewed from the vehicle interior side of the laminated glass 50. Note that FIG. 15A, enlargedly illustrating a vicinity surrounded by a broken line in the laminated glass 50 of FIG. 13, illustrates a state where distortion occurred in the zebra pattern 60. Here, the laminated glass 50 has a transmission region 50y and a light shielding region 50x. The transmission region 50y is a portion where the transmission region of the intermediate film is located in the case of Example 1 and is a portion where the ceramic light shielding layer is not provided in the case of Comparative Example 1. On the other hand, the light shielding region 50x is a portion where the light shielding region of the intermediate film is located in the case of Example 1 and is a portion where the ceramic light shielding layer is provided in the case of Comparative Example 1.

In case the laminated glass having a ceramic light shielding layer usually, as illustrated in FIG. 15A, the black line 61 of the zebra pattern 60 is viewed distorted to curve near a boundary 51 between the transmission region 50y and the light shielding region 50x. Therefore, a distance between a position where an extension line L obtained by extending a left edge of the black line 61 as it was intersected with the boundary 51 and a position where the black line 61 actually intersected with the boundary 51 was evaluated as distortion (W).

Figure 15B:
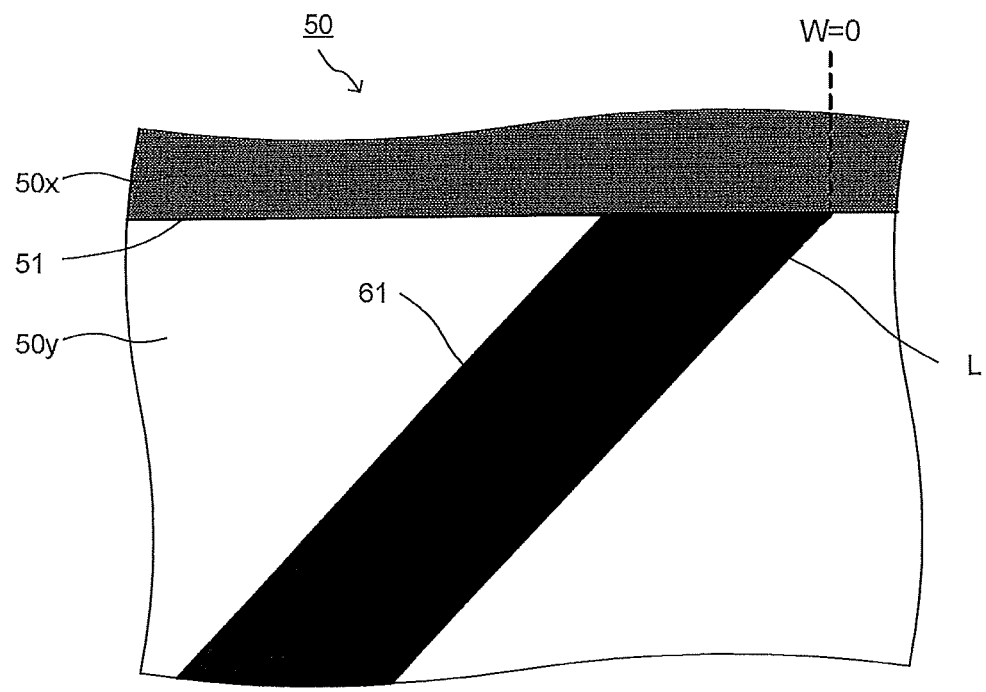
FIG. 15B is a view illustrating a result of evaluation of distortion of a transmitted image regarding Example 1.

As a result, in the laminated glass in Comparative Example 1, the distortion (W) was recognized to be as large as 7 mm. On the other hand, in the laminated glass in Example 1, the distortion (W) was recognized to be suppressed to 0 mm as illustrated in FIG. 15B, namely, the black line 61 was viewed as a straight line without distortion. Such a difference is considered to be caused by baking when forming the ceramic light shielding layer. The occurrence of distortion was considered to be suppressed because of no need to bake the laminated glass of Example 1.

What is claimed is:

1. A laminated glass for a vehicle, comprising:
    a pair of glass plates; and
    an intermediate adhesive film between the pair of glass plates,
    wherein the intermediate adhesive film has (i) one continuous transmission region which includes an optical opening for transceiving an optical signal of an information acquisition device disposed inside a vehicle and transceiving the optical signal to an exterior side of the vehicle, and (ii) a light shielding region provided around a whole periphery of the optical opening except a part thereof, and
    wherein a light shielding region of the laminated glass for the vehicle corresponding to the light shielding region of the intermediate adhesive film has a visible light transmittance of 3% or less.

2. The laminated glass for the vehicle according to claim 1,
    wherein the light shielding region of the intermediate adhesive film is made of a colored intermediate adhesive film.

3. The laminated glass for the vehicle according to claim 1,
    wherein the light shielding region of the intermediate adhesive film has a configuration in which a light shielding film is sandwiched between a pair of transparent intermediate adhesive layers.

4. The laminated glass for the vehicle according to claim 1, further comprising:
    a ceramic light shielding layer provided in a peripheral edge portion of either one of principal surfaces of the glass plates in a manner not to adjoin the optical opening.

5. The laminated glass for the vehicle according to claim 4,
    wherein the ceramic light shielding layer is provided on a vehicle interior side principal surface of the glass plate located on a vehicle interior side among the glass plates and has a mounting portion on which the information acquisition device is mounted in a neighborhood of an outer edge of the optical opening.

6. The laminated glass for the vehicle according to claim 5,
    wherein the ceramic light shielding layer is provided in a dotted pattern in a region close to the optical opening.

7. The laminated glass for the vehicle according to claim 1,
    wherein a plurality of the optical openings are provided.

8. The laminated glass for the vehicle according to claim 1, further comprising:
    a conductive layer capable of carrying a current in the optical opening vicinity including the optical opening.

9. The laminated glass for the vehicle according to claim 1,
    wherein the transmission region of the intermediate adhesive film consists of a multilayer film of three layers or more having a sound insulating property.

* * * * *